(12) United States Patent
Labrecque

(10) Patent No.: US 9,587,845 B2
(45) Date of Patent: Mar. 7, 2017

(54) EXTRACTION FAN ASSEMBLY INCLUDING A DAMPER THAT CLOSES FIRMLY WHEN THE FAN IS NOT RUNNING AND REDUCES THE PRESSURE DROP WHEN THE FAN IS RUNNING AT FULL SPEED

(71) Applicant: Robert Labrecque, St. Bernard (CA)

(72) Inventor: Robert Labrecque, St. Bernard (CA)

(73) Assignee: Groupe Ro-Main Inc., St. Lambert-de-Lauzon, QC ( * ) Notice: Subject to any disclaimer, the term of this patent is extended or adjusted under 35 U.S.C. 154(b) by 2 days.

(21) Appl. No.: 14/297,987

(22) Filed: Jun. 6, 2014

(65) Prior Publication Data

US 2014/0287675 A1    Sep. 25, 2014

Related U.S. Application Data

(63) Continuation of application No. 14/031,170, filed on Sep. 19, 2013, which is a continuation of application No. 13/194,238, filed on Jul. 29, 2011, now abandoned, which is a continuation-in-part of application No. 13/085,174, filed on Apr. 12, 2011, now Pat. No. 8,672,734, which is a continuation-in-part of application No. 12/966,515, filed on Dec. 13, 2010, now abandoned.

(51) Int. Cl.
| | |
|---|---|
| *F24F 7/10* | (2006.01) |
| *F16K 15/03* | (2006.01) |
| *F04D 25/14* | (2006.01) |
| *F24F 13/14* | (2006.01) |

(52) U.S. Cl.
CPC ............... *F24F 7/10* (2013.01); *F04D 25/14* (2013.01); *F16K 15/033* (2013.01); *F24F 13/1426* (2013.01)

(58) Field of Classification Search
CPC ......... F16K 15/033; F16K 15/33; F24F 7/013
USPC .............. 454/259, 241, 147, 350, 353, 358; 312/319.6; 417/360
See application file for complete search history.

(56) References Cited

U.S. PATENT DOCUMENTS

| | | | |
|---|---|---|---|
| 2,552,236 | A | 5/1951 | Trane et al. |
| 2,682,826 | A | 7/1954 | Walborg |
| 2,687,687 | A | 8/1954 | Prudhon |
| 2,739,521 | A | 3/1956 | Spear |
| 2,767,735 | A | 10/1956 | Darling |

(Continued)

*Primary Examiner* — Steven B McAllister
*Assistant Examiner* — Frances F Hamilton
(74) *Attorney, Agent, or Firm* — Adrian D. Battison; Ade & Company Inc.

(57) ABSTRACT

An extraction fan has a housing mounted in a wall with an outlet duct extending through the wall to an outlet opening outside the wall. A damper flap is mounted on the fan suspended by a hinge at an upper edge so as to extend in a closed position across the opening and is movable to an open position under forward air flow from the fan, and tightly closes against a resilient deformable seal when the fan is shut off. A spring biasing cam applies inwards force to the damper flap to bias the damper flap into the closed position, and an outwards force also to bias the damper flap into the fully open position. The mounting plate includes a hood having a top wall extending over the top of the damper flap and a down-turned front flange extending parallel to the damper flap to a bottom edge.

9 Claims, 22 Drawing Sheets

(56) References Cited

U.S. PATENT DOCUMENTS

| | | | |
|---|---|---|---|
| 2,770,833 A * | 11/1956 | Drechsel | F24F 13/1406 16/255 |
| 2,804,008 A * | 8/1957 | Koch | F04D 25/14 415/148 |
| 2,916,176 A | 12/1959 | Widmer | |
| 3,590,858 A | 7/1971 | Martin | |
| 3,604,458 A * | 9/1971 | Silvey | F16K 1/165 137/601.11 |
| 3,665,958 A | 5/1972 | Dunkellis | |
| 3,791,281 A * | 2/1974 | Steiner | F24F 7/013 454/350 |
| 3,951,051 A | 4/1976 | Dry | |
| 3,990,471 A | 11/1976 | Schutzer | |
| 4,108,371 A | 8/1978 | Leemhuis | |
| 4,557,183 A | 12/1985 | Kolt | |
| 4,823,679 A | 4/1989 | Robbins | |
| 4,926,921 A * | 5/1990 | Heinemann | B60K 11/085 160/115 |
| 4,982,474 A | 1/1991 | Kjellstrom | |
| 5,046,408 A | 9/1991 | Eugenio | |
| 5,071,064 A | 12/1991 | Abujudom et al. | |
| 5,107,888 A * | 4/1992 | Dunmire | E03C 1/106 137/512 |
| 5,186,385 A | 2/1993 | Karabin et al. | |
| 5,195,928 A | 3/1993 | Gigola | |
| 5,236,391 A | 8/1993 | Schaefer | |
| 5,290,200 A | 3/1994 | Kiser | |
| 5,376,044 A | 12/1994 | Tippin et al. | |
| 5,695,116 A | 12/1997 | Karabin | |
| 5,727,999 A | 3/1998 | Lewis | |
| 5,738,276 A | 4/1998 | Saur | |
| 5,915,960 A | 6/1999 | Check et al. | |
| 5,921,862 A * | 7/1999 | Ucciardi | F24F 11/047 137/527.6 |
| 6,179,588 B1 | 1/2001 | Liang et al. | |
| 6,203,423 B1 | 3/2001 | Craw et al. | |
| 6,321,687 B1 | 11/2001 | Lemmon et al. | |
| 6,404,629 B1 | 6/2002 | Austin et al. | |
| 6,468,054 B1 | 10/2002 | Anthony et al. | |
| 6,533,375 B2 | 3/2003 | Fulterer et al. | |
| 6,537,146 B1 | 3/2003 | Haynes | |
| 6,629,886 B1 | 10/2003 | Estepp | |
| 6,679,290 B2 | 1/2004 | Matthews et al. | |
| 8,214,971 B2 | 7/2012 | Carter et al. | |
| 8,708,787 B2 * | 4/2014 | Alexander | B60H 1/008 454/162 |
| 2005/0199845 A1 | 9/2005 | Jones et al. | |
| 2006/0266422 A1 * | 11/2006 | Feenstra | F16K 15/033 137/527 |
| 2007/0272637 A1 | 11/2007 | Rigas | |
| 2008/0242215 A1 | 10/2008 | Pagenstert | |
| 2008/0248739 A1 | 10/2008 | Carlson et al. | |
| 2009/0186571 A1 | 7/2009 | Haro | |
| 2010/0314569 A1 * | 12/2010 | Hildreth, Jr. | F16K 1/165 251/212 |
| 2011/0116909 A1 | 5/2011 | Weisser et al. | |
| 2012/0184195 A1 * | 7/2012 | Browne | B60H 1/3421 454/75 |

* cited by examiner

EXTRACTION FAN ASSEMBLY INCLUDING A DAMPER THAT CLOSES FIRMLY WHEN THE FAN IS NOT RUNNING AND REDUCES THE PRESSURE DROP WHEN THE FAN IS RUNNING AT FULL SPEED

This application is a continuation of application Ser. No. 14/031,170 filed Sep. 19, 2013 which is a continuation of application Ser. No. 13/194,238 filed Jul. 29, 2011 which is a continuation in part of application Ser. No. 13/085,174 filed Apr. 12, 2011 which is a continuation in part of application Ser. No. 12/966,515 filed Dec. 13, 2010 and now pending.

This invention relates to a fan construction which includes a damper that closes firmly to prevent air backdraft when the fan is inoperative, or when the fan is running at minimum speed against strong opposing winds. The device also reduces the pressure drop when the fan is running at full speed.

BACKGROUND OF THE INVENTION

In recent years prevention of disease to animal husbandry barns has reached the extent where attempts are made to ensure that all air entering the barn is filtered of pathogens that can be airborne. For this reason a number of companies provide systems for filtering the air at the intakes. Typically the air intakes communicate with the roof space with the air entering into the containment area through the ceiling and also from the wall. This can be done by providing filtration membranes engaging the air as it enters the roof space or it can be done by providing on each intake duct a separate membrane assembly attached onto the intake opening within the roof space.

Much work has been done, for example by Noveko of Quebec, on developing improved membranes which provide an effective and cost efficient filtration system. However it is known that pathogens can still enter the containment area by the fans louvers and disease can still strike, often with very damaging results.

However it is known that pathogens can still enter the containment area through closed fans louvers, due to known negative air pressure (0.05 to 0.2 inch of water) inside the building. It has been experimented that a 24" fan that is not running even with the louvers closed, can allow in as much as 400 cfm of viral contaminated air into the building (with inside static pressure of 0.05 inch of water), and that 3×24" fans can allow in as much viral contaminated air into a building as a 12" running fan would do if it were used to push viral contaminated air into a building, which may cause airborne pathogen to strike, often with very damaging results.

The animals concerned are typically pigs and poultry but of course other animals require the same protection from pathogens that can be airborne.

The arrangement described herein is applicable not only to the sector of animal confinement barns, but also to any other sectors where ventilation applies, such as industry, commercial, residential applications, or any other, where backdraft must be controlled for whatever reason.

SUMMARY OF THE INVENTION

It is one object of the invention to provide a fan construction with a damper flap to prevent reverse flow of air when not required.

According to one aspect of the invention there is provided a damper flap assembly for mounting on a fan construction having a fan housing and a fan mounted in the housing;

the damper flap assembly comprising:

a mounting plate having an opening through which the air passes and a flange surrounding the opening;

a pivotally mounted damper flap arranged to extend in a closed position across the opening when the fan is not running, with an outer peripheral portion of the damper flap engaging the flange around the opening;

the damper flap having a front surface facing forwardly away from the fan and a rear surface facing toward the fan;

the damper flap being movable from the closed position between a partially open position to a fully open position under forward air flow from the fan by pivoting on the hinge away from the flange;

the damper flap being suspended by a hinge member adjacent an upper edge of the damper flap and pivotal about a hinge axis of the hinge member;

the hinge member including a transverse support at the hinge axis and at least one support arm extending from the transverse support adjacent the upper edge in a direction forwardly of the damper flap to a position in front of the damper flap, said at least one support arm being connected by a connection member to the damper flap at a position below a top edge of the damper flap.

Preferably said connection member is arranged at a position adjacent or below a transverse center line of the damper flap. However the connection member can be placed above the transverse center line of the damper flap in some cases.

Preferably said at least one arm is connected to the damper flap only at said connection member allowing top and bottom edges of the damper flap to flex relative to said connection member.

Preferably said at least one support arm includes a depending portion extending along the front face of the flap member and spaced therefrom.

Preferably there is provided at least one bracket fastened to the front face of the flap member and said depending portion of said at least one support arm is engaged with the bracket.

Preferably the depending portion comprises a rod and the rod is engaged through a hole of the bracket.

Preferably the transverse support is located at a position in a vertical plane rearward of the rear face of the flap member.

Preferably the transverse support is located at a height above the top edge of the flap member.

This construction defined herein, in view of its shape and arrangement, can be used using solely gravity to close the flap. However in some cases there is provided a spring biasing arrangement applying biasing forces to said at least one arm in one or both directions toward the open position and toward the closed position.

When used, preferably the spring biasing arrangement includes two springs which are independently adjustable.

Preferably the two springs are arranged to provide different forces to the damper flap such that independent adjustment provides different changes in the biasing forces.

Preferably one of the two springs is arranged on one side of the hinge member and the other on the other side of the hinge member.

Preferably said at least one arm comprises two arms spaced transversely so that each is located on a respective side of a vertical centerline of the flap member.

Preferably the two arms are mounted on two separate components of the transverse support such that the arms can pivot independently.

According to a second aspect of the invention there is provided a damper flap assembly for mounting on a fan construction having a fan housing and a fan mounted in the housing;

the damper flap assembly comprising:

a mounting plate having an opening through which the air passes and a flange surrounding the opening;

a pivotally mounted damper flap arranged to extend in a closed position across the opening when the fan is not running, with an outer peripheral portion of the damper flap engaging the flange around the opening;

the damper flap having a front surface facing forwardly away from the fan and a rear surface facing toward the fan;

the damper flap being movable from the closed position between a partially open position to a fully open position under forward air flow from the fan by pivoting on the hinge away from the flange;

the damper flap being suspended by a hinge member adjacent an upper edge of the damper flap and pivotal about a hinge axis of the hinge member;

the hinge member including a transverse support at the hinge axis and two depending arms spaced transversely so that each is located on a respective side of a vertical centerline of the flap member.

According to a third aspect of the invention there is provided a damper flap assembly for mounting on a fan construction having a fan housing and a fan mounted in the housing;

the damper flap assembly comprising:

a mounting plate having an opening through which the air passes and a flange surrounding the opening;

a pivotally mounted damper flap arranged to extend in a closed position across the opening when the fan is not running, with an outer peripheral portion of the damper flap engaging the flange around the opening;

the damper flap having a front surface facing forwardly away from the fan and a rear surface facing toward the fan;

the damper flap being movable from the closed position between a partially open position to a fully open position under forward air flow from the fan by pivoting on the hinge away from the flange;

the damper flap being suspended by a hinge member adjacent an upper edge of the damper flap and pivotal about a hinge axis of the hinge member and at least one support arm;

wherein there is provided a spring biasing arrangement applying biasing forces to said at least one arm in directions both toward the open position and toward the closed position;

and wherein the spring biasing arrangement includes two springs which are independently adjustable.

The arrangement described herein is applicable not only to the sector of animal confinement barns, but also to any other sectors where ventilation applies, such as industry, commercial, residential applications, or any other, where backdraft must be controlled for whatever reason.

One key point of this new automatic mechanism described herein is to control almost 100% of backdraft (when cover is tightly closed), for example to prevent any pathogen infiltration in an air-filtered animal confinement building, when the fan is not running at all, or running at slow speed against the opposing force of strong winds, in the latter case the cover being slightly opened and automatically mechanically maintained in this position.

A second key point is that this new automatic mechanism increases by more than 15% the efficiency of the fan running at full speed in comparison with conventional shutters used in the agricultural sector. This can be explained by the mechanism applying a force helping the flap to be opened at its maximum opening and therefore avoiding or reducing pressure drop. Fan efficiency is even more decreased when conventional shutters are dirty. When the fan is running at minimum speed, the device with the abutment option, increases the efficiency of the fan because the design of the exterior outlet permits blocking of any opposing wind coming from any direction, allowing the air to be exhausted toward the exterior totally freely, even in case of strong opposing winds.

The seal can be carried on the outer peripheral portion of the damper flap.

Preferably the seal comprises a deformable fin of a type which can readily deform under the relatively low forces involved from gravity on the damper flap and from back pressure of reverse air flow so that a sealing effect is obtained.

Typically the opening is rectangular although other shapes are also possible particularly circular.

Preferably the mounting plate includes a hood extending from the hinge over the top of the damper flap to maintain protection from falling contaminants such as snow and preferably the hood has a down-turned flange to engage the damper flap and prevent pivotal movement of the damper flap beyond a predetermined angle.

Preferably there is provided an abutment member, such as a pin carried on the mounting plate, for holding the damper flap in a slightly open position, the abutment member being retractable for example by an electrically operable remote control device to allow closing of the damper flap. The key point is the provision of the abutment, which acts to hold the flap slightly ajar to allow the low airflow to escape with a protection against the wind forces. Other shapes and arrangement of abutment member can be used and these can be actuated in many different ways than the electrical solenoid primarily proposed.

Preferably there is provided a latch for providing a closing force for holding the damper flap in the closed position to provide an increased closing force when the flap is closed but allowing release to the open position as soon as the air flow generates enough force to overcome the latch. The latch can be a magnetic strip around the periphery of the damper flap or a magnet located at the bottom edge of the damper flap. Other types of latch or system can be used for example a spring or counterweight etc, to assist in holding the flap in the closed position which latch is released as soon as the air flow operates to move the flap away from the closed position.

Preferably the damper flap comprises a flat panel which may be an insulated panel of a foam material or similar stiff flat member. Other constructions of flap can be used which may not necessarily be insulated.

Preferably the damper flap assembly is mounted on outside end of the fan housing. In this case the fan housing may retain or include an additional louver closure at the wall opening.

Alternatively the damper flap assembly can be mounted on the fan housing at the wall opening inside the building.

There may be provided a heating wire for heating the seal to prevent freezing.

Preferably the hinge is a flexible strip extending from the damper flap to the mounting plate and mounted on a spacer strip at the mounting plate. Other types of hinge can also be used with the intention that they are resistant to jamming or freezing and they are not restricting the airflow.

Preferably the air inlets are arranged at the ceiling of the containment area communicating with a roof space above the containment area. However other locations of the filtered air inlets are possible and many different designs of barn ventilation can be used. Preferably each air inlet includes a filter assembly carried in the roof space. However the air flow into the roof space through the eaves can be filtered by exterior mounted filters added on the outside of the building. It is of course intended that, apart from the inlets and the extraction fans, the containment area is sealed against ingress of pathogen containing air.

The arrangement described above can have two different and independent objectives. Firstly to block the virus contained in air back-draft, from infiltrating fan louvers when a fan is not running in an air-filtered barn for swine and also for a poultry barn. Secondly to block the wind effect against the fan when a fan is running at slow or minimum speed to prevent air-back draft pathogen contamination.

It has been determined that the conventional louver arrangement used with agricultural fans is not sealed enough to prevent back-draft and virus contamination.

Thus the flap and the pin action control the minimum ventilation rate for the fan when the fan faces wind forces. This can be used both in air-filtered barns and even for barns without air filters.

The addition of the pin at the bottom of the panel is used in order to be able to keep a continuous minimum opening which can vary from 0.5 to 6 inch according to the remote adjustment of the pin. Then, even if the slow running fan faces a lot of wind, the damper will stay open and the air can be easily blown out by the fan, preventing air back-draft pathogen contamination in air-filtered barns. In the case of barns that are not air-filtered, the objective is not to prevent virus transmission but only to control the minimum ventilation rates even with or without windy conditions. The purpose is to improve the air quality inside the barn even if winds faces the fans. This will allow an easy minimum ventilation rate adjustment for the operators and reduced energy cost for fan operation and building heating.

In order to have a better minimum ventilation rate control, the standard louvers installed on the fan can be removed.

In a filtered building, this arrangement can allow the number of fans in the first and second ventilation stage to be reduced by using larger fans, which provide both reduced contamination risk by virus from air back-draft and also reduced energy consumption. With higher flow rates on the first and second ventilation stage, this will also allow to reduce the number of fans on stage three and more. In some cases, this feature will allow to avoid the use of stage three and more.

In non-filtered swine and poultry barn, this feature allows a better minimum ventilation rate control during windy period. When the wind comes in the fan direction, this has a restriction effect on the fan's airflow. When a fan is running at its minimum speed, a strong wind can almost totally block the airflow and cause air quality problem inside the building because the contaminants are still in the barn. Then, this flap assembly will help to optimized the air quality control and the heating cost in the barns. Also, this concept can allow to reduce the number of fans on first and second ventilation stage by using larger fans and reduced energy consumption.

The basic idea of this improved backdraft damper flap design consists in the addition of an innovative automatic mechanism that requires no electricity for its operation, permitting through mechanical applied pressure on the damper flap, to make the damper flap absolutely airtight when the fan is not running. A second important aspect is that there is almost no airflow restriction (less than 1% compared to 15% for the conventional shutters used in agricultural fans) caused by the damper flap when the fan is running, the damper flap mechanism exercising a significant outward force on the damper flap to keep it opened. A third aspect of this backdraft damper flap design is that it permits to use a reduced number of damper flaps (but of larger dimension) on large size fans, which allows for much less air flow restriction, if compared to traditional dampers that feature numerous louvers.

This Innovative Backdraft Damper flap System as described in more detailed hereinafter may have one or more of the following features and advantages.

It may be used with variable speed fans or 1-speed fans, which is different from competitive products.

Its mechanism permits to apply significant pressure on the damper flap to prevent any air infiltration when the fan is not running and keeps the damper flap partially or fully opened when the fan is running. It is important to note that the same mechanism plays both roles, which is to maintain the damper flap closed when the fan is not running, and to maintain it partially or fully opened when the fan is running.

It is a simple, low-cost and maintenance-free mechanical system that requires no electricity, contrary to costly dampers that are currently sold on the market, which louvers are activated by an electrical motor.

This backdraft damper flap also features a rubber strip on its edges, which optimizes airtightness when the fan is not running, and which by far favorably compares to any traditional gravity closed dampers used in the agricultural sector.

The light damper flap itself causes almost no air-flow restriction when the fan is running, which permits to increase the airflow ventilated out of the building. This way when many fans are required to ventilate a certain building, the increase of airflow exhausted from the building through each fan, permits to reduce the power of fans, and/or simply permits to avoid using one or more fans, which saves energy.

The system saves electricity by improving the cfm ratio per watt. For a fan that runs at full speed, with the same energy used, the airflow exhausted from the building is increased (higher cfm ratio per watt).

The system can be used for any one or more of the following targeted Markets

Animal producers who currently have or plan to have air-filtered confinement buildings, and who want to block out non-filtered air backdraft when fans are not running.

Producers who have buildings that are not equipped with air filters, but who wish to increase the efficiency rate of airflow exhausted from their buildings through their fans. This can be accomplished by replacing their traditional dampers by the backdraft damper flaps, which may be installed on interior or exterior building walls. The damper flap also contributes to the reduction of fan energy consumption and/or to the improvement of air quality in buildings.

For both types of clienteles, the backdraft damper flap also eliminates the need to use traditional fan winter damper flaps (winter cover), saving on annual installation and removal labor cost, plus eliminating the need of storage space for those winter damper flaps during the summer. Cold air infiltration through non-running fans during the cold season creates a need for increased heating, which means higher energy consumption to heat the building(s).

In the sector of pig, chicken and other types of animal confinement buildings, air-filtered buildings with negative pressure (pig market is specially targeted here), it is particularly important for backdraft damper flaps to be low-cost, maintenance-free and most important, to be airtight to avoid infiltration of non-filtered air through non-running fans, or fans that need to be run at minimum speed in presence of strong opposing winds.

The main benefits of the airtight damper flap for animal confinement buildings are as described hereinafter:

Prevents infiltration of airborne parasites, non-desired air flow, or backdraft that may transport airborne pathogens (for air-filtered building application).

Replaces traditional winter cover to prevent cold air infiltration

No negative impact on the airflow that is exhausted by fan(s) when added to traditional dampers (for air-filtered building application, the addition of the airtight damper flap to the traditional damper is highly recommended)

Increases the airflow exhausted from the building when traditional fan louvers are removed in non-filtered building application Meets the needs of all animal producers, including those who have air-filtered buildings Works as well with variable speed fans or 1-speed ones (on-off), contrary to those marketed by the competition, which work only with 1-speed fans Works on all fan dimensions Easy installation Simple mechanism requiring no electricity Maintenance-free and reduces corrosion of sheet metal exterior walls of animal confinement buildings Closes automatically when fan is turned off or stops running for any reason No dust or dirt build-up Easy pressure washer cleaning Specially designed to push exhausted air away from the building, which otherwise is known to cause corrosion on exterior walls Prevents air, pathogen, dust or dirt from infiltrating the building when installed on exterior wall, which keeps the fan area clean, and which allows for easy access to the fan without having to remove the backdraft damper flap, thus eliminating potential risks of airborne pathogen infiltration.

The higher the negative pressure in the building, the more airtight the damper flap is.

What is of particular importance in this arrangement, is that the damper flap can be and remain airtight closed when the fan is not running in an air-filtered building, and also the fact that the damper flap itself does not create any restriction when the fan is operating.

As described herein, this new airtight backdraft damper flap may be either installed on the interior wall of a building (FIG. 8), or on the exterior wall (FIG. 3).

This airtight backdraft damper flap can be installed on any type of fans ranging from 10" to 55".

As described hereinafter, this new airtight backdraft damper flap is usually installed on the exterior wall of the building (FIG. 9) but it can also be installed on the interior wall.

This airtight backdraft damper flap can be installed on any 10" to 55" interior fans but it can also be used with larger fan dimensions.

The new featured damper flap mechanism also allows to keep the backdraft damper flap in minimal opening setting to prevent the wind from affecting the outward air flow when the fan is running at a slow speed in presence of strong opposing winds. In an air-filtered building, when a fan stops running, the mechanism minimal opening function is automatically neutralized by a solenoid (optional), which instantly closes the damper flap.

In a traditional non-filtered building the idea is to completely remove and replace standard fan louvers by the airtight damper flap, though here, the damper flap does not need to be as airtight as it must be for air-filtered building applications, for which the main objective is to prevent airborne virus infiltration. The damper flap and its innovative mechanism still offer here several benefits:

The damper flap causes no air-flow restriction whatsoever when the fan is operating, which increases the exhaust capacity of the fan at a given power, which increases energy efficiency by increasing the cfm ratio per watt.

The damper flap mechanism automatically shuts and renders the backdraft damper flap airtight during the winter, preventing any infiltration of undesired cold air through fans that are not running, thus eliminating the need to install traditional winter cover on fan outlets.

The damper flap mechanism also allows to lock the backdraft damper flap in minimal opening setting to prevent the wind from affecting the outward air flow when the fan is running at a slow speed. In an air-filtered animal confinement building, when a fan is not running, the damper flap lock mechanism is automatically neutralized by a solenoid, which instantly closes the damper flap.

As described hereinafter, the new airtight backdraft damper flap may be either installed on the interior wall of a building (see FIG. 8), or on the exterior wall (FIG. 3)

This airtight backdraft damper flap can be installed on any type of fans ranging from 10" to 55".

As described herein, the new airtight backdraft damper flap is usually installed on the exterior wall of the building (FIG. 9) but it can also be installed on the interior wall, but in this case, with no impact on wind control.

This airtight backdraft damper flap can be installed on any 10" to 55" interior fan but it can also be used for larger fan dimensions.

In the commercial, institutional and industrial market, this airtight backdraft damper flap can also be used on any type of fan or air duct inlets or outlets. In the winter time, the damper flap can be closed to avoid heat loss and save energy, or maintained open when the fan is running. It can also be kept in a minimal opening setting when a minimum air flow control is required in the presence of strong opposing winds, in which case, the automatic minimal opening function of the mechanism represents an interesting and valuable characteristic.

The backdraft damper flap mechanism permits to close the damper flap when necessary, or to keep it open when the fan is running, which in both cases saves energy.

The arrangement can also be used in the residential market for example as a clothes dryer damper, stove fan damper, air exchange damper or furnace inlet and outlet damper. In the winter time, the damper flap can be closed to avoid heat loss and save energy, or maintained fully or partially opened when the fan is running, causing no air flow restriction, which also saves energy.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
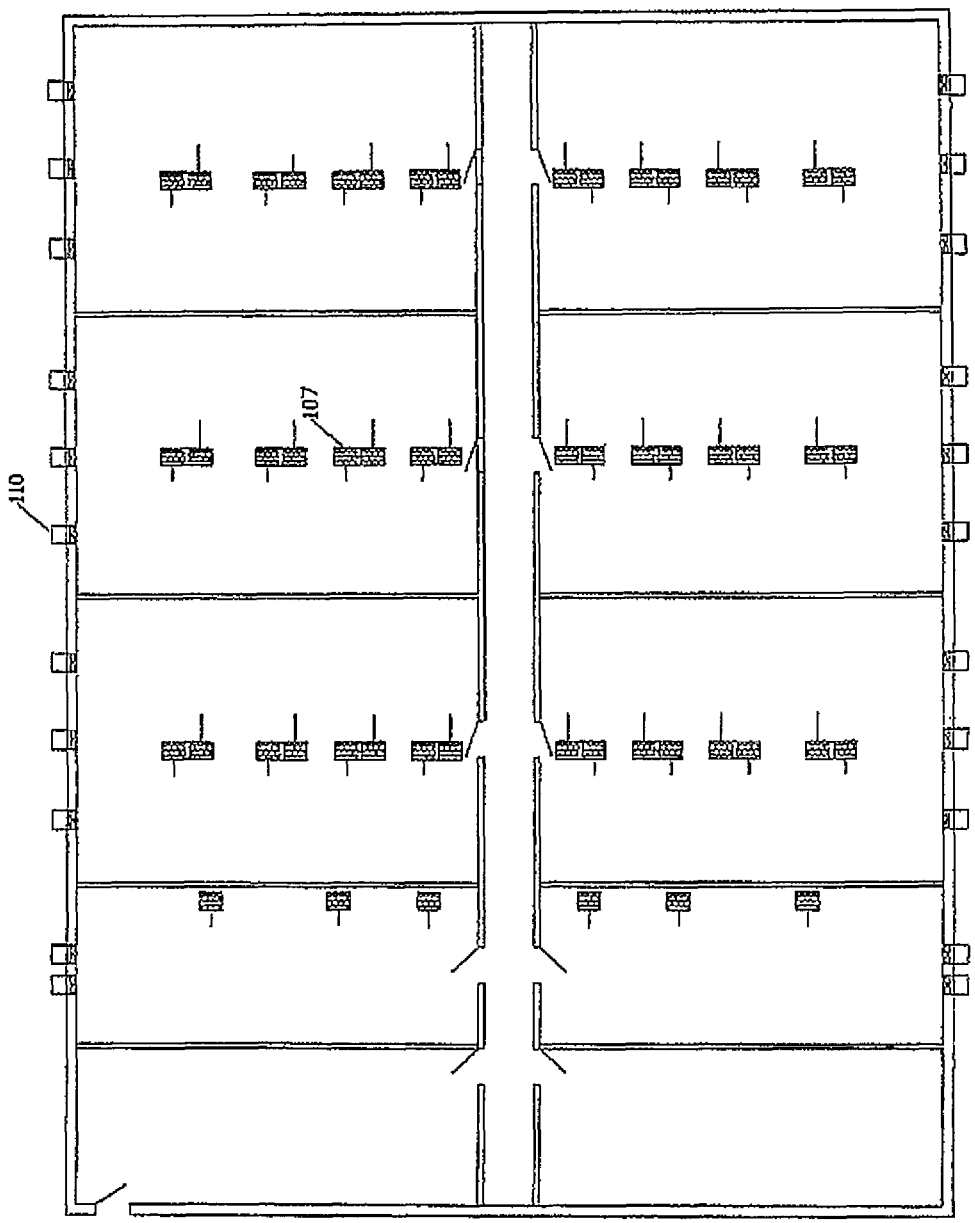
FIG. 1 is a plan view of a barn including a fan construction according to the present invention.
Figure 2:
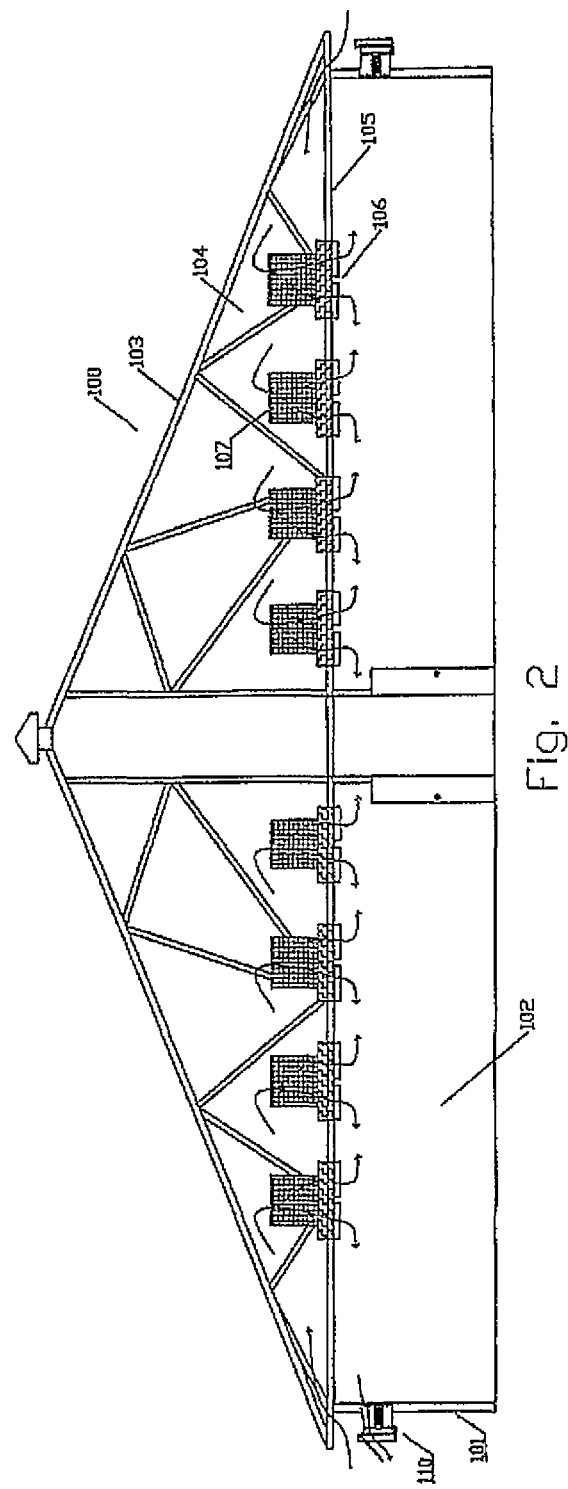
FIG. 2 is a vertical cross-sectional view of the barn of FIG. 1.

In FIGS. 1 and 2 is shown an animal husbandry barn 100 including peripheral walls 101 defining a containment area 102. A roof 103 defines a roof space 104 above a ceiling 105.

A plurality of air inlets 106 provide air entry into the containment area where each air inlet 106 has an air filter system 107 for extraction from incoming air of pathogens so as to prevent transmission of disease to the animals.

A plurality of extraction fans 110 are located at spaced positions around the walls for generating an air stream exiting the containment area so as to generate a negative air pressure within the barn so as draw replacement air into the containment area through the air inlets 106. Apart from the inlets and the extraction fans, the containment area is sealed against ingress of pathogen containing air.

The extraction fans can be driven at variable rate including at least high and low speed and can be shut off when not required. Shutting off fans when possible of course reduces energy usage. High fan speed is required at the highest temperatures to provide the required level of ventilation and cooling. Lower fan speed is required at other times. The system can be computer controlled to ensure sufficient ventilation and cooling while minimizing energy usage.

Figure 3:
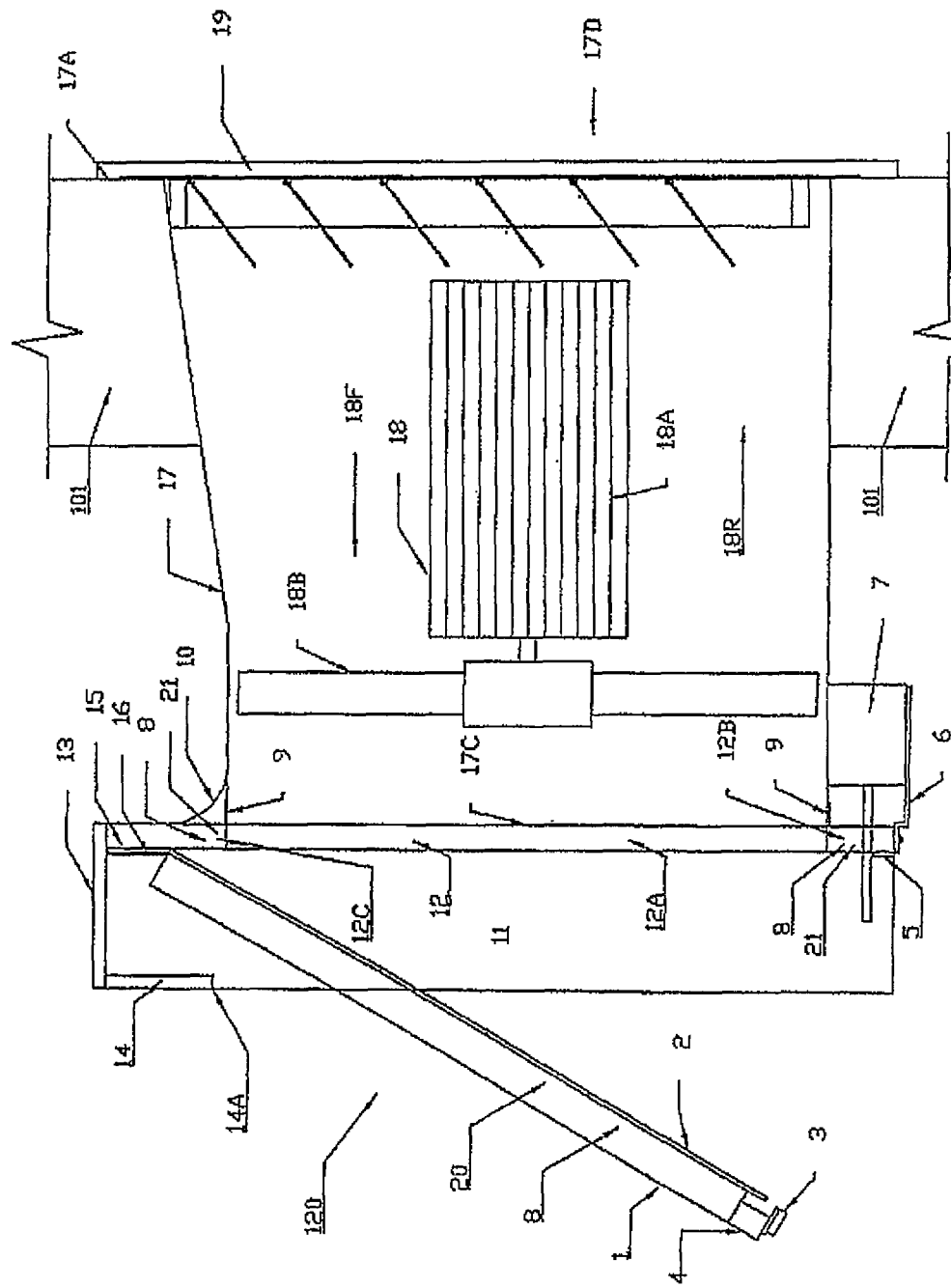
FIG. 3 is a cross-sectional view along the same lines as FIG. 2 on a much enlarged scale showing one fan construction with the closure flap thereof in an open position.

As shown in FIG. 3, each fan has a fan housing 17 defining a duct extending from an end plate 17A which mounts in the wall 101. The plate and duct form a circular or rectangular passage for air escaping from the wall opening. A fan 18 with a motor 18A and fan blades 18B is mounted in the duct of the fan housing to drive the air outwardly from the wall opening to an open end 17C of the fan housing 17. The open end 17C thus forms an opening spaced outwardly from the wall 101.

The fan housing thus defines an inlet opening 17D at the wall and an outlet duct 17 extending through the wall to an outlet opening 17C outside the wall.

A damper flap assembly 120 is mounted on the fan housing which includes a mounting plate or board 12 having an opening 12A through which the air passes and a flange 12B surrounding the opening and defining top flange 12C, bottom flange 12B and side flanges. A flexible rubber seal or silicon 10 allows to seal the joint between fan housing 17 and the mounting plate 12.

Figure 4:
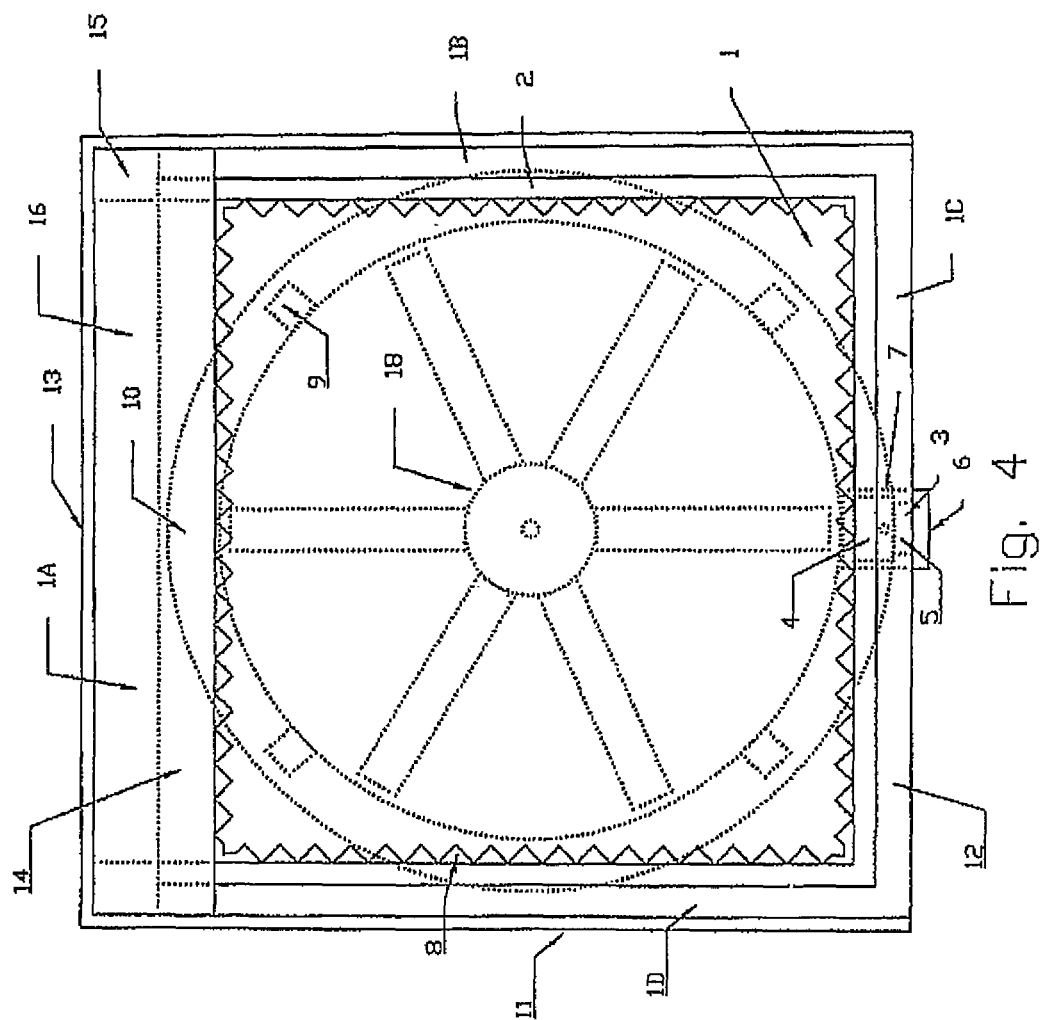
FIG. 4 is a front elevational view of the fan construction of FIG. 3.
Figure 5:
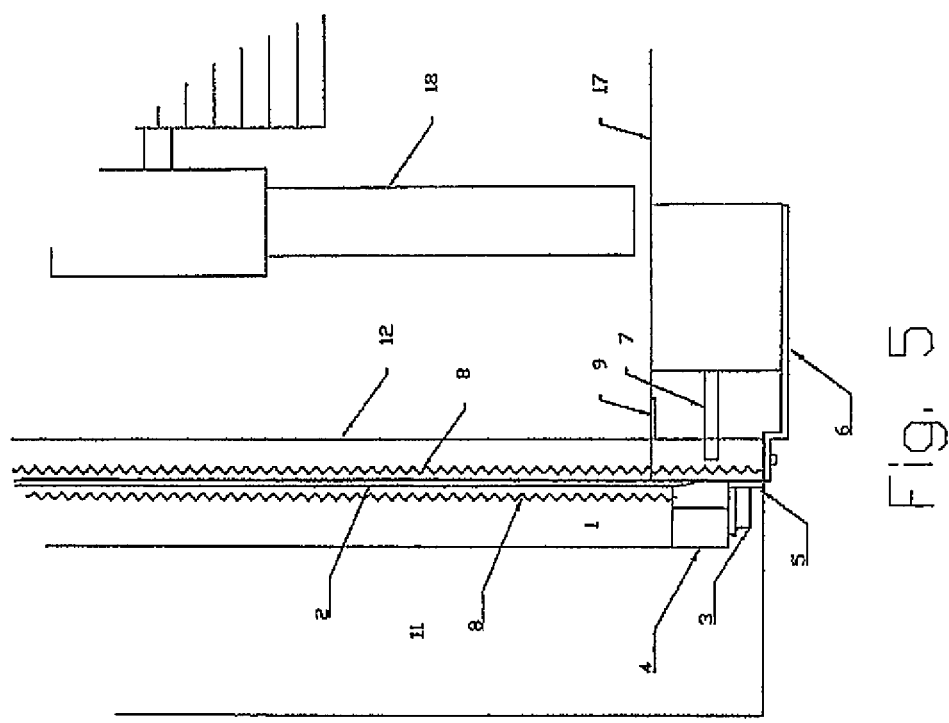
FIG. 5 is a cross-sectional view on a further enlarged scale than FIG. 3 showing one part only of the fan construction with the closure flap thereof in a closed position with the magnet at the bottom part of the flap.

A damper flap 1 in the form of a styrofoam or similar board covered with a plastic sheet on each surface and covering the edges. The board or flap 1 is suspended by a hinge 16 at an upper edge engaging the top flange 12C. The board 1 is pivotal about its upper edge so as to hang from the hinge under gravity. The board 1 can therefore extend in a closed position across the opening 12A with an outer peripheral portion 1A, 1B, 1C and 1D (FIG. 4) of the damper flap engaging the flange 12B, 12C around the opening 12A.

The damper flap 1 is movable to an open position as shown in FIG. 3 under pressure from forward air flow 18F from the fan 18 by pivoting on the hinge 16 away from the opening flange 12B, 12C.

A resilient deformable fin seal 2 is provided on the peripheral portions 1A, 1B, 1C and 1D so as to act between the outer peripheral portion of the damper flap and the flange. The seal surrounds the opening 12A and is arranged to seal the damper flap to prevent reverse flow 18R of air through the fan housing.

The seal comprises a deformable fin 2A (FIG. 6) which can be readily depressed and provide an effective seal under the low forces of back pressure from the negative air pressure inside the building.

The mounting plate 12 includes a top cover 13 extending from the hinge 16 outwardly over the top of the damper flap 1 and includes down-turned flange 14 with a bottom edge 14A to engage the damper flap 1 and prevent pivotal movement of the damper flap 1 beyond a predetermined angle. The cover 13 can also include side plates 11 which prevent air from engaging the sides of the flap 1.

In operation, the flap is held open by air flow at a high rate from the fan 18 in the forward direction 18F. In the event that the fan is shut off when the air flow is not required, the flap closes under gravity until it engages the plate 12 causing the seal to engage. In this case the back pressure on the flap will hold it closed forming a seal to prevent back flow of any contaminated air into the building. This is particularly important in times of the year such as Fall or Spring where the outside temperature is not sufficiently high that high fan flow is required, and when the minimum ventilation causes the air to be humid and slow moving, leading to high levels of contaminants.

In order to hold the flap slightly open during times when the fan is driven at a lower rate for less air movement, an abutment member 7 is provided for butting the bottom edge portion 1C holding the damper flap in a slightly open position. The abutment member 7 (FIG. 6) includes a pin 7A which is retractable on a solenoid 7B mounted on a plate 6 underneath the fan housing 17 on the rear of the plate 12 to allow closing of the damper flap. Thus the pin is electrically operable by a remote control device for full retraction to allow closing and for adjustment to set the required amount of opening depending on required air flow rate.

Figure 7:
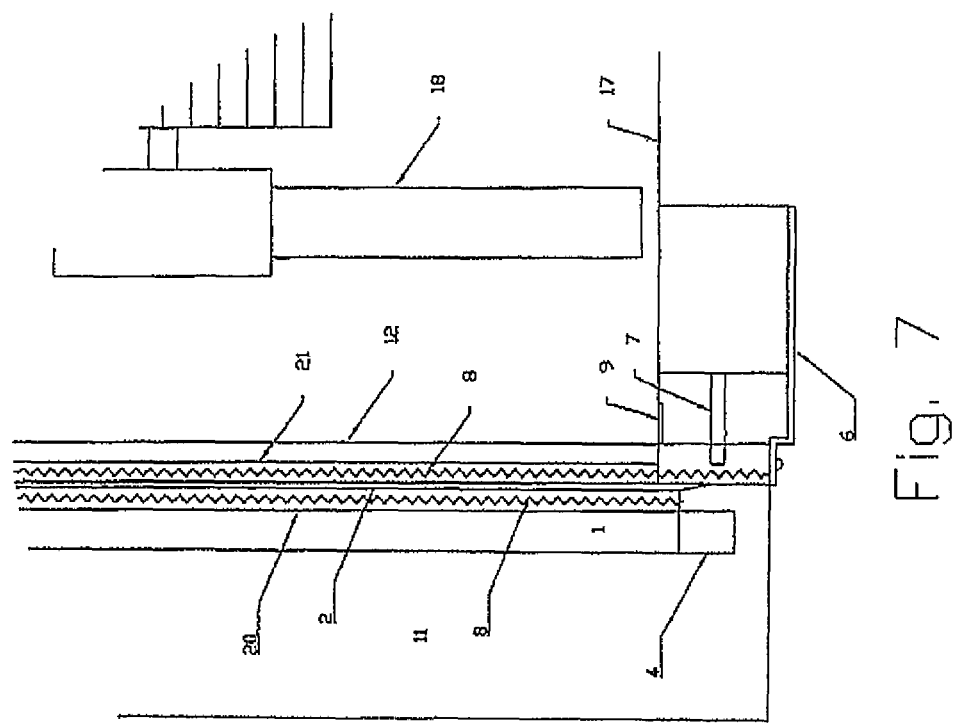
FIG. 7 is a cross-sectional view of a modified embodiment on a further enlarged scale than FIG. 3 showing one part only of the fan construction with the closure flap thereof in the closed position with the magnet on the perimeter of the flap.

In order to increase the closing pressure to supplement the back air pressure, a magnet latch is provided for providing a closing force for holding the damper flap in the closed position. This can comprise a magnetic strip 20 (FIG. 7) around the periphery of the damper flap cooperating with a metal strip 21 on the mounting plate 12.

Alternatively the magnet latch comprises a magnet 3 (FIG. 7) carried on a support plate 4 and cooperating with a metal plate 5 on the mounting plate 12 located at the bottom edge of the damper flap.

A heating wire 8 can be provided for heating the seal to prevent freezing.

The hinge 16 (FIG. 3) is a flexible strip across the top of the flap 1 and extending from the damper flap 1 to the mounting plate 12 and mounted on a spacer strip 15 at the mounting plate 12. Other types of hinge can be used.

The typical additional louver closure 19 remains in some cases at the wall opening to provide an interior closure when the fan is shut off.

The arrangement described above includes a fan housing with an exterior duct, which extends outwardly of the wall where the damper flap assembly is mounted on an outer end of the duct.

Figure 8:
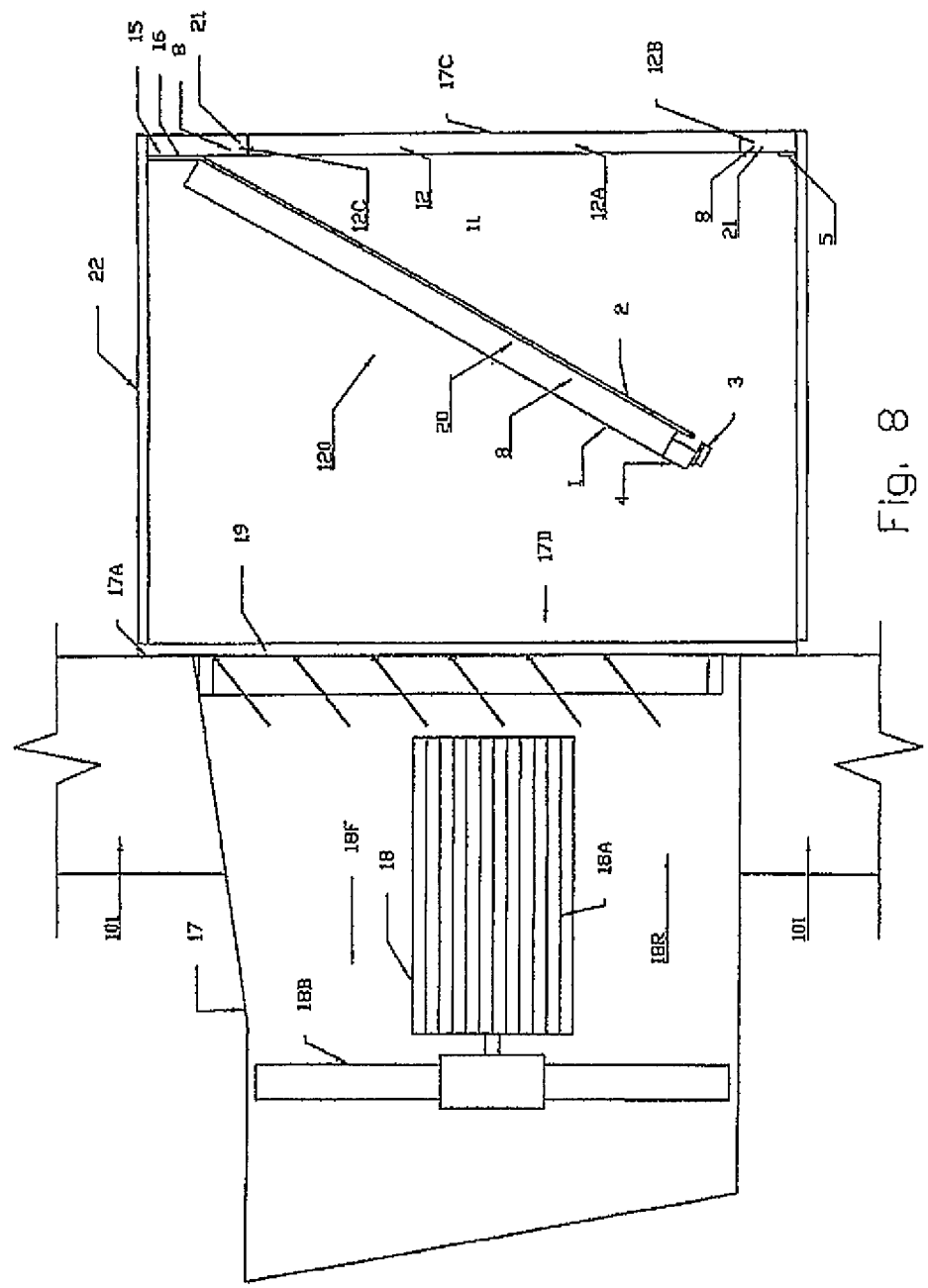
FIG. 8 is a cross-sectional view similar to that of FIG. 3 showing a modified fan construction with the closure flap assembly thereof at the inlet end at the wall opening inside the building.

In FIG. 8 is shown a cross-sectional view similar to that of FIG. 3 showing a modified fan construction with the damper flap assembly thereof at the inlet end at the wall opening. In this case the device is located in front of the louver arrangement 19, which can be removed or may remain in place. Apart from this modification, the construction is the same as that described above. In FIG. 8, the damper flap will not act to block the wind effect at low speed because it is installed upstream from the fan. So that, in that case, the only objective is to block the contaminated reverse flow of the air in the back-draft. Thus the solenoid abutment is not required. A solenoid may be provided to open the flap when the flap is blocked by freezing and/or keep minimum opening when the fan running at minimum speed. A duct 22 which can be rectangular or circular is located between the damper flap and the fan inlet. This duct is suitably fastened to the wall.

Figure 9:
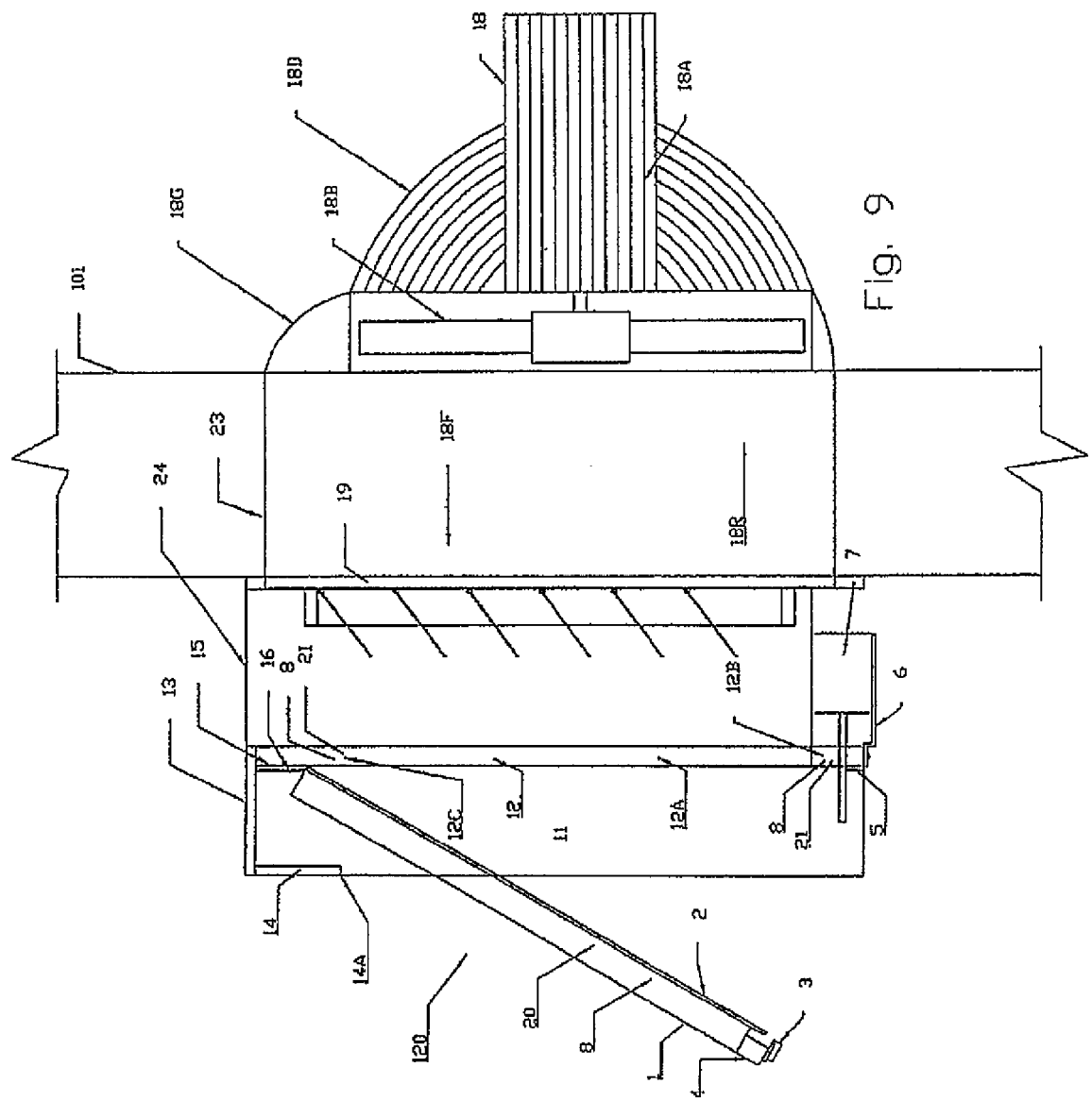
FIG. 9 is a cross-sectional view similar to that of FIG. 3 showing a modified fan construction which has no exterior duct on the fan housing so that the closure flap assembly thereof is mounted on the fan housing directly at the wall opening outside the building.

In FIG. 9 is shown a cross-sectional view similar to that of FIG. 3 showing a yet further modified fan construction with no duct so that the damper flap assembly thereof is mounted directly at the outside surface of the wall. In this arrangement there is provided a wire mesh 18D on the inside surface at the fan 18B as a protection guard and a fan venturi 18G. In this arrangement the louvers 23 are mounted on the outside of the wall with its box insert into the wall. There may be provided also a short duct 24 between the wall and the damper flap. Apart from this modification, the construction is the same as that described above.

Figure 10:
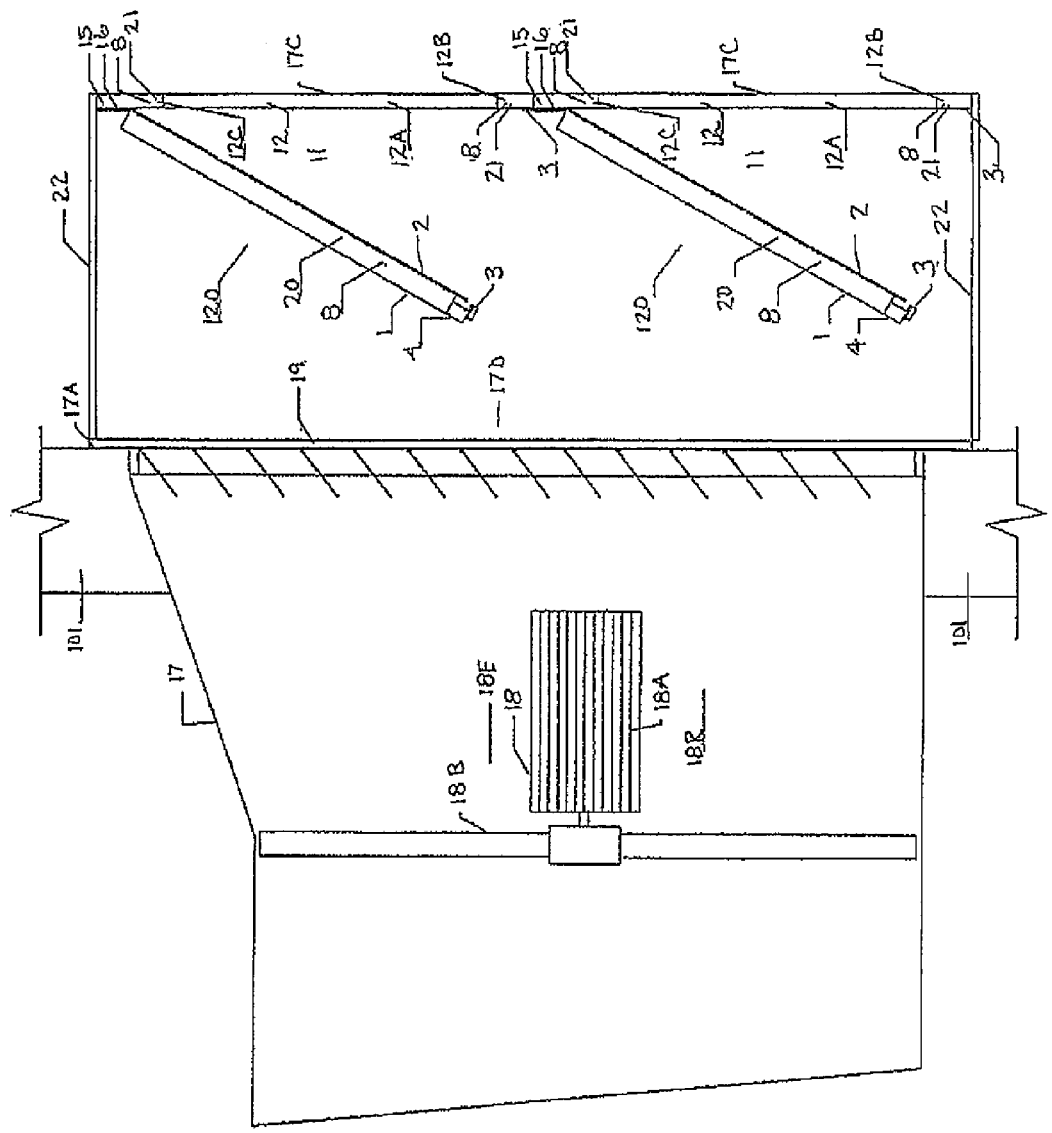
FIG. 10 is a cross-sectional view similar to that of FIG. 3 showing a modified fan construction which provides more than one row of closure flaps.
Figure 11:
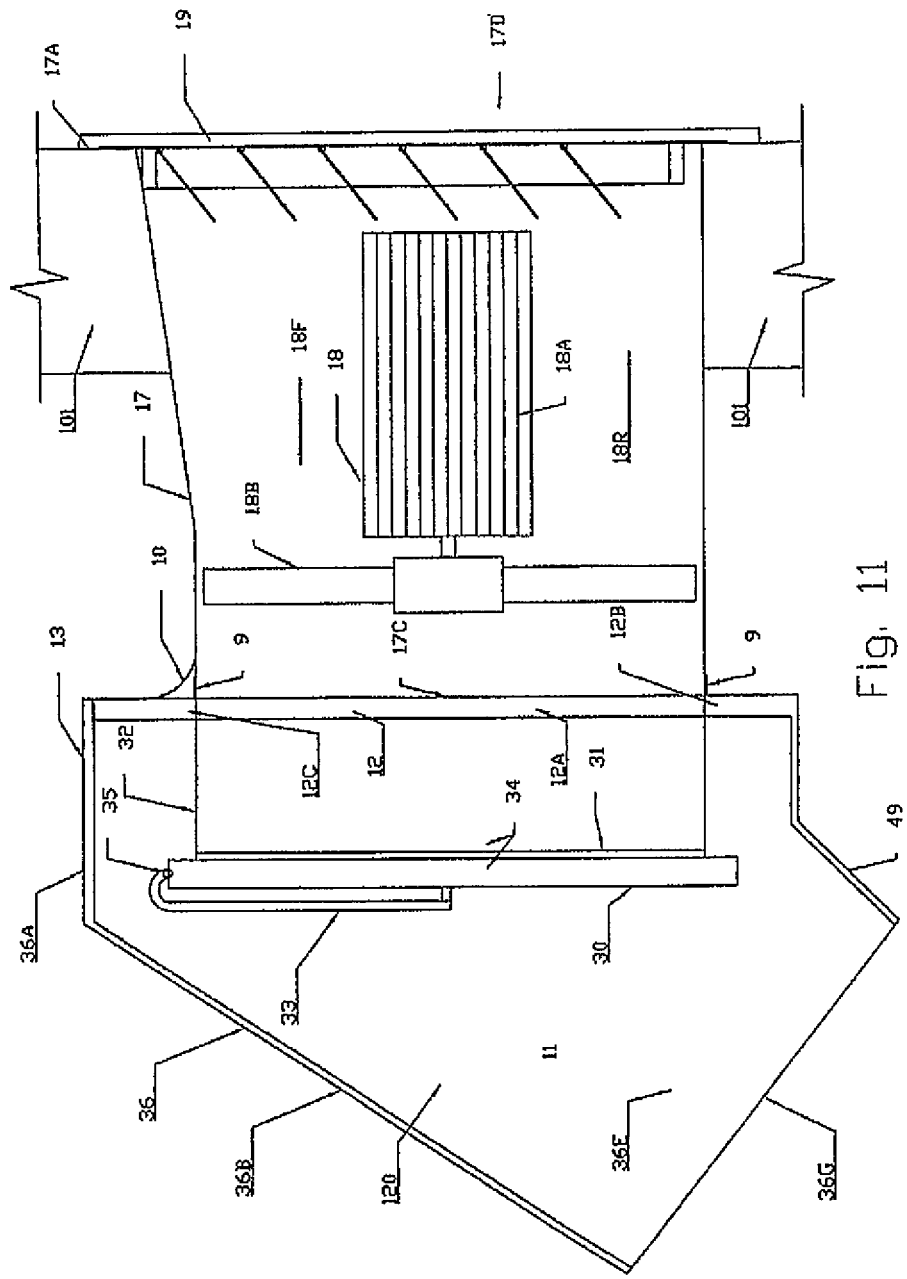
FIG. 11 is a cross-sectional view of a further embodiment showing a modified hood and including an additional mechanism (partially shown) for applying spring force to the damper flap to bias it both into the fully open and fully closed positions and showing the damper flap in the fully closed position.

In FIG. 10 there is shown an arrangement with two rows of flaps 120. This arrangement can be used for example with a 36 inches fan. The flap dampers can be either installed inside or outside the building as described above. In some constructions there may also be more than two rows as well as more than 1 column of flaps for example for 55 inches fans.

Turning now to FIGS. 11 to 17, the following additional elements have been added:

Item 32 which is a circular extension lip where the flap is closed on the edge.

Figure 13:
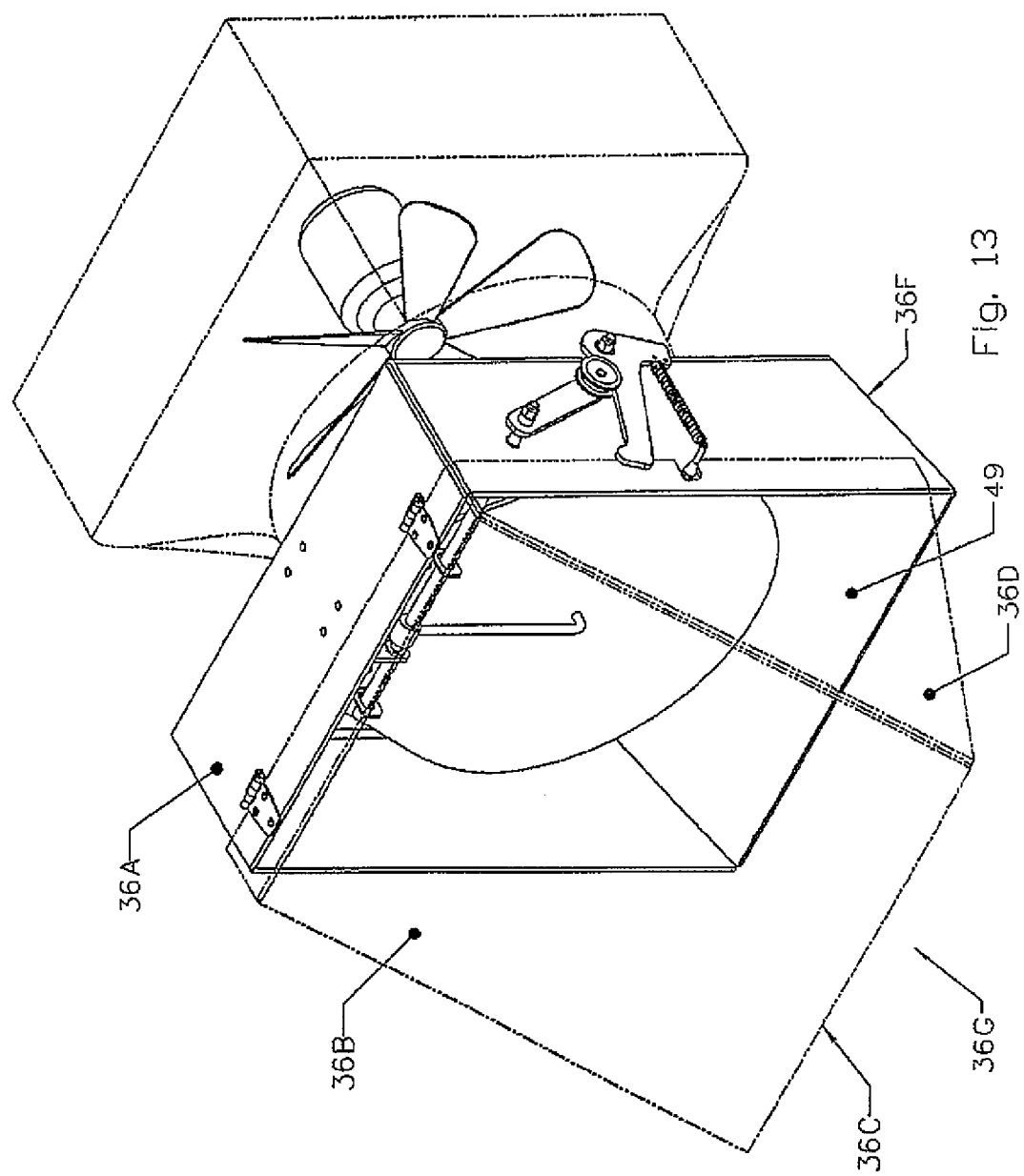
FIG. 13 is an isometric view from the front and one side.

Item 33 which is a rod or flat bar attached on one end to the hinge and attached on the other end to the center of the flap which forces the flap to close tightly on the edge of the circular extension lip 32. In FIG. 13 it will be noted that the rod 33 or engagement member acts centrally of the circular damper flap along a center line of the flap to equalize forces on the peripheral edge or edges of the damper flap.

Item 34 which is an electric heating cable which can be installed either on the periphery of the flap and/or the periphery of the circular extension lip to prevent freezing and is optional.

Item 35 which is a stainless steel rod hinge.

Figure 12:
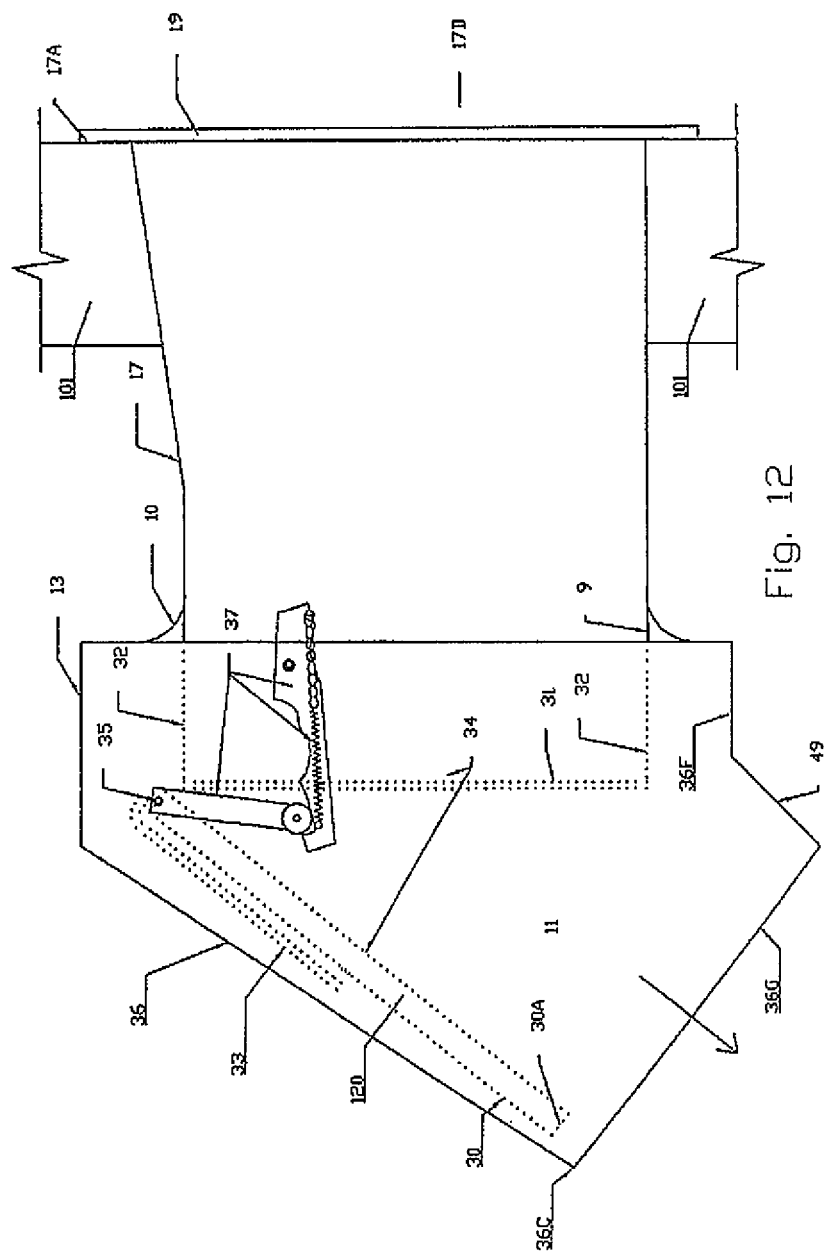
FIG. 12 is a side elevational view of the further embodiment of FIG. 11 showing in more detail the additional mechanism for applying spring force to the damper flap to bias it both into the fully open and fully closed positions and showing the damper flap in the fully open position.

Item 36 which is a hood or cover acting as wind breaker. This piece protects the damper flap against snow and rain and provides a nozzle or opening through which the air escapes while resisting back flow of wind against the flap. The hood shown 36 in FIGS. 11 and 13 has a horizontal top wall 36A extending forwardly over the top of the damper flap and its hinge, and a down-turned front flange 36B extending downwardly and forwardly from the front edge of the wall 36A along the damper flap to a bottom edge 36C. The hood has a width a little wider than the opening from the fan and the flap so as to contain the flap and define side walls 36D and 36E. The down-turned front flange 36B, as shown in FIG. 12, extends parallel to the damper flap in the fully open position thereof with the bottom edge 36C of the flange at or beyond a bottom edge 30A of the damper flap 30 so that the whole of the flap is contained within the hood. The hood also has a bottom wall 36F extending forwardly from the mounting plate and a down-turned front flange 49 extending downwardly and forwardly from a front edge of the wall 36F. The deflector is provided in order to create a shield against strong opposing winds, and to reduce or prevent draft on the wall of the barn, which is known to be an important cause of rust on exterior sheet metal siding of animal confinement buildings. That is the objective of this part to move the air away from the building as it exhausts from the fan. Also the hood side walls, top wall and bottom wall are connected to form a nozzle directing the air outwardly and downwardly from a mouth 36G of the nozzle which is in an inclined plane facing forwardly and downwardly.

Figure 14:
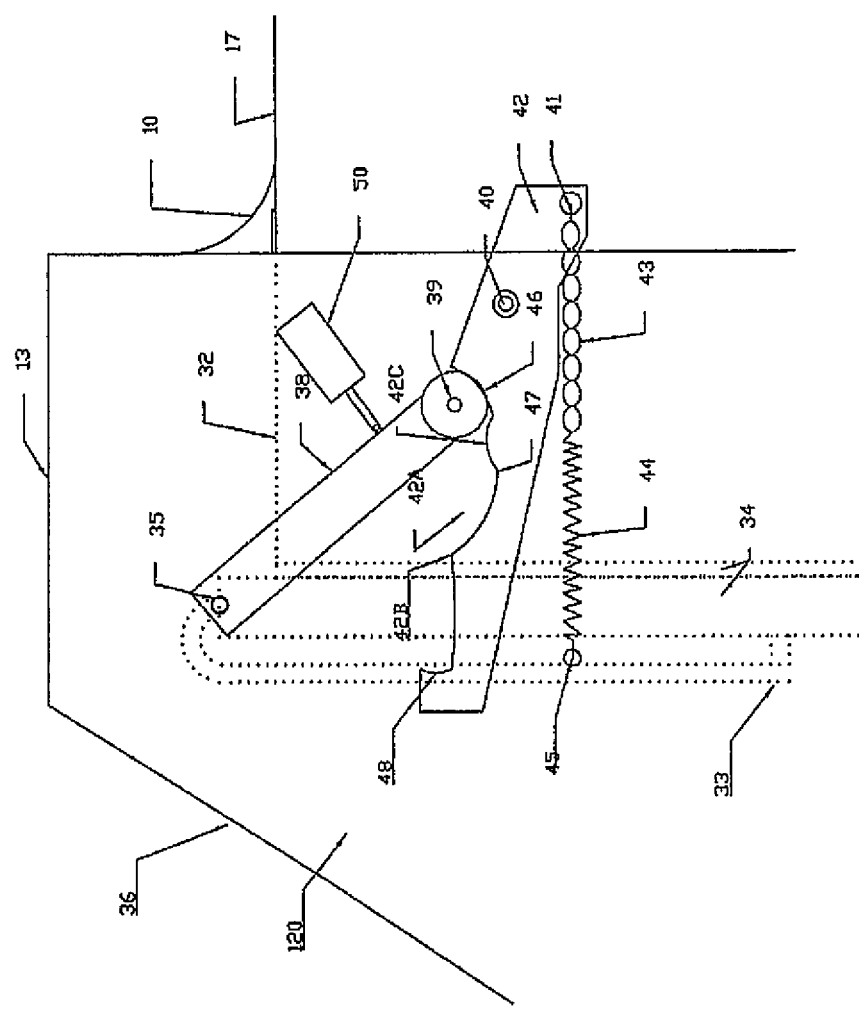
FIG. 14 is a side elevational view similar to that of FIG. 12 showing in larger scale the additional mechanism for applying spring force to the damper flap showing the damper flap in the fully closed position and showing an optional solenoid for applying an additional force to move the damper flap to the partially open position.

Item 37 shown in FIG. 12 and in larger view in FIG. 14 is a spring biasing arrangement helping to control the opening and closing of the flap. The spring biasing arrangement is arranged for applying force to the damper flap. The spring biasing arrangement 37 includes a cam plate 42 pivotally mounted on a pin 40 carried on the housing. The cam plate 42 has a cam surface 42A engaging a cam follower roller 39. A spring 44 applies a spring force to the cam so as to cause the cam to rotate around the pin 40 in an upwards or downwards direction and apply a force to the cam follower roller 39 from the cam surface 42A. The cam follower roller 39 is attached to the flap 30 by a lever 38 to apply a force thereto at the hinge 35 through the rod 33.

In FIG. 14, the cam surface 42A is shaped so as to control the forces applied to the roller 39 and therefore to the flap. In this embodiment, the surface 42A includes a peak 42B at a position part way along the surface between a left hand end 48 at the fully open position and a right hand end 46 at the fully closed position. In this way, on the left side of the peak as viewed, the roller 39 tends to move toward the left, under the spring pressure from the spring 44 biasing the surface upwardly toward the roller. Symmetrically on the right side of the peak, the roller 39 tends to move toward the right. Thus the spring biasing arrangement is arranged on the right side of a partially open position at the peak 42B to bias the damper flap into the fully closed position and on an opposed side of the partially open position to bias the damper flap into the fully open position.

The spring is attached at one end to a chain 43, which connects to a hole 41 in the housing. At the other end the spring is attached to a screw 45 or other connecting item attaching the spring to the damper housing This mechanism allows inwards pressure to be put on the flap when the flap is closed so that, when the fan has stopped running, the flap is and remains tightly closed. The pressure is adjustable by adjusting the spring pressure. When the fan is at the minimum speed, the mechanism will keep the flap at minimum opening in order to reduce the inwards pressure drop caused by strong opposing winds or the weight of the flap itself. When the fan is running at maximum speed, the mechanism will help to keep open the flap and reduce the pressure drop to increase the fan performance. The spring tension can be adjusted to adjust the flap pressure on the edge of the lip edge.

In position 46 of the roller 39, the biasing arrangement puts inwards force on the flap in order to close it tightly.

In addition to the peak 42B, the surface 42A includes a raised section 42C between a position 47 and the end position 46. In position 47 of the roller 39, the biasing arrangement acts by the raised portion 42C to apply a slight outwards force on the flap in order to keep it open at minimum opening when the fan is running at minimum speed in order to reduce pressure drop on the fan caused by strong opposing wind or the flap weight itself.

In position 48 of the roller 39, the biasing arrangement applies outwards force on the flap in order to keep it fully open when the fan is running at maximum speed, in order to reduce the pressure drop on the fan caused by the flap weight itself, and maximize the fan performance.

Figure 6:
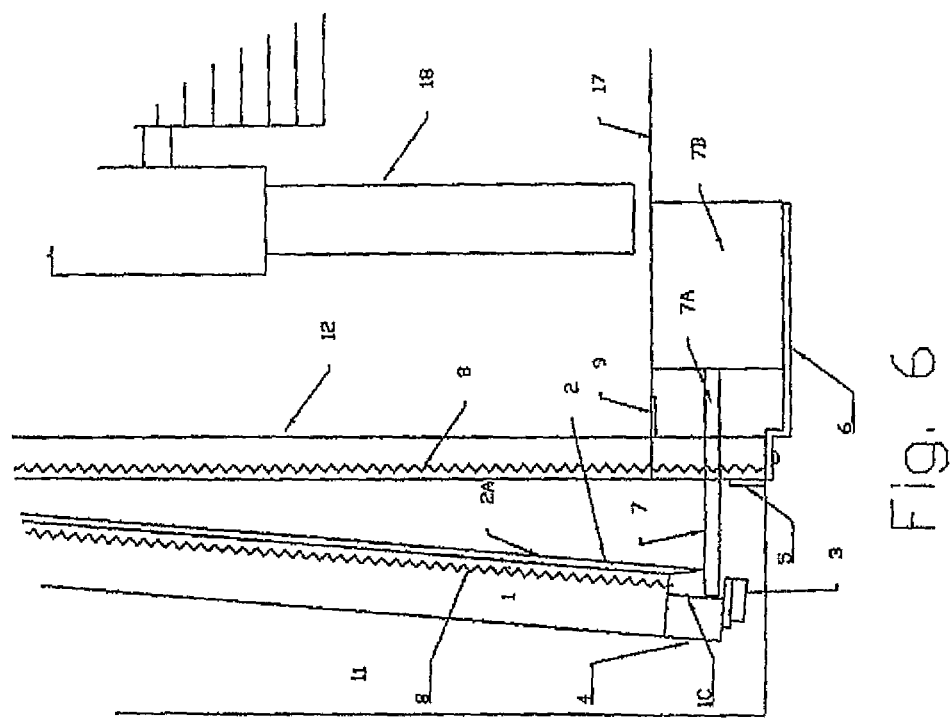
FIG. 6 is a cross-sectional view on a further enlarged scale than FIG. 3 showing one part only of the fan construction with the closure flap thereof in a partly open position held opened by a pin.

Also in FIG. 14 is shown a solenoid 50 (optional), operated in response to actuation of the fan, which is positioned to apply outwards force directly to the lever 38 when the lever is in the position 46. Thus when the fan starts, the solenoid 50 applies a push on the lever 38 for maintaining the flap minimum opening as desired. When the fan stops, the solenoid is also deactivated to retrieve its initial position to let the flap close. The solenoid does not apply any force on the flap to close it. The solenoid can be also installed in the previous arrangement as shown in FIG. 6 at parts 7, 7A and 7B.

Figure 15:
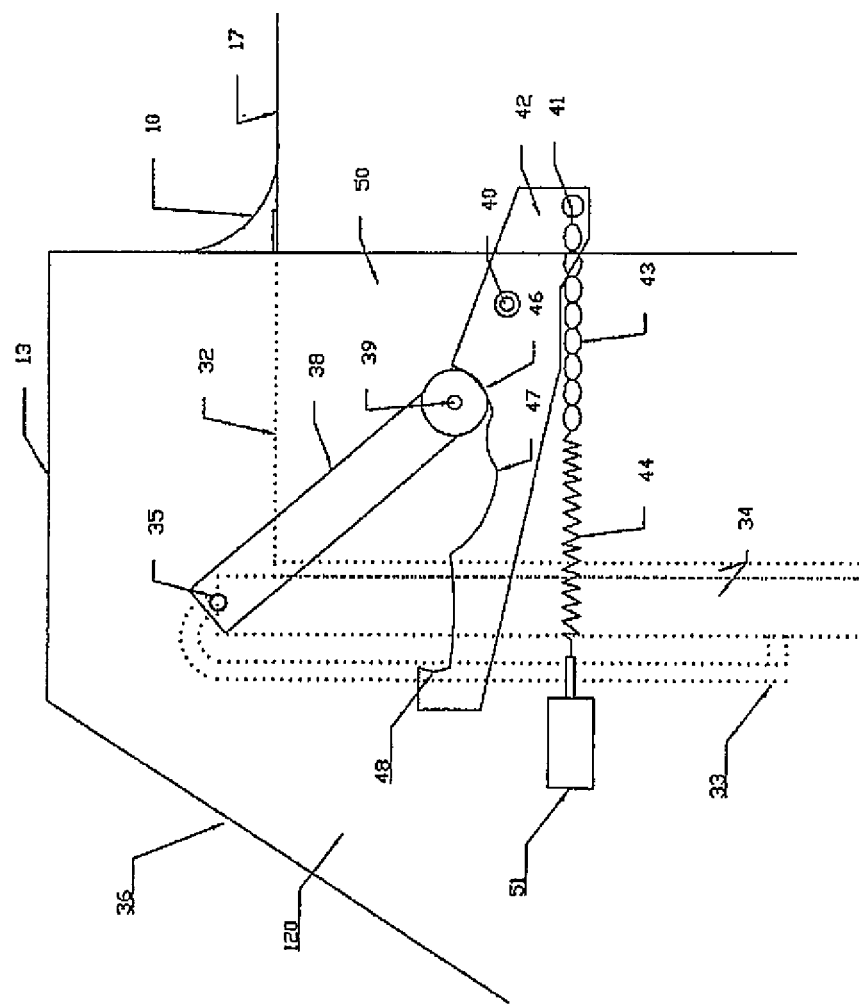
FIG. 15 is a side elevational view similar to that of FIG. 12 showing in larger scale the additional mechanism for applying spring force to maintain the damper flap closed when required, showing the damper flap in the fully closed position and showing an optional solenoid for increasing the spring force when required.

Also in FIG. 15 is shown a solenoid 51 which operates in the same manner as solenoid 50. However in this case the solenoid is located at the end of spring 44 to apply an increased force on the spring 44. This can be used when the fan stops running to put inwards pressure on the flap to maximize the flap air tightness. When the fan starts, the solenoid moves outwardly to reduce the spring force and to reduce the pressure on the flap when the fan is running at maximum speed and avoid the reduced fan performance or fan airflow. The solenoids 50 and 51 can be installed in various ways on the device in order to close the flap firmly, to allow a minimum opening and help the mechanism to retain the flap fully open when fan is at maximum speed.

Thus as described above there is provided an operable device such as a solenoid 50 or 51 for applying additional force to the spring biasing arrangement to increase the force when required. The operable device is dependent on operation of the fan so that it operates when the fan is actuated and uses power from the fan operation. The cam surface 42A includes a recess at the partially open position 47 so as to apply spring force to the damper flap to tend to hold the damper flap in the partially open position. However additional forces to the right or left will overcome this partial restriction and allow the flap to move to the fully open and fully closed positions as required.

The solenoid can be installed in various ways and can be replaced by a simple adjustable pin which can be manually or automatically opened or closed with variable adjustment.

Figure 16:
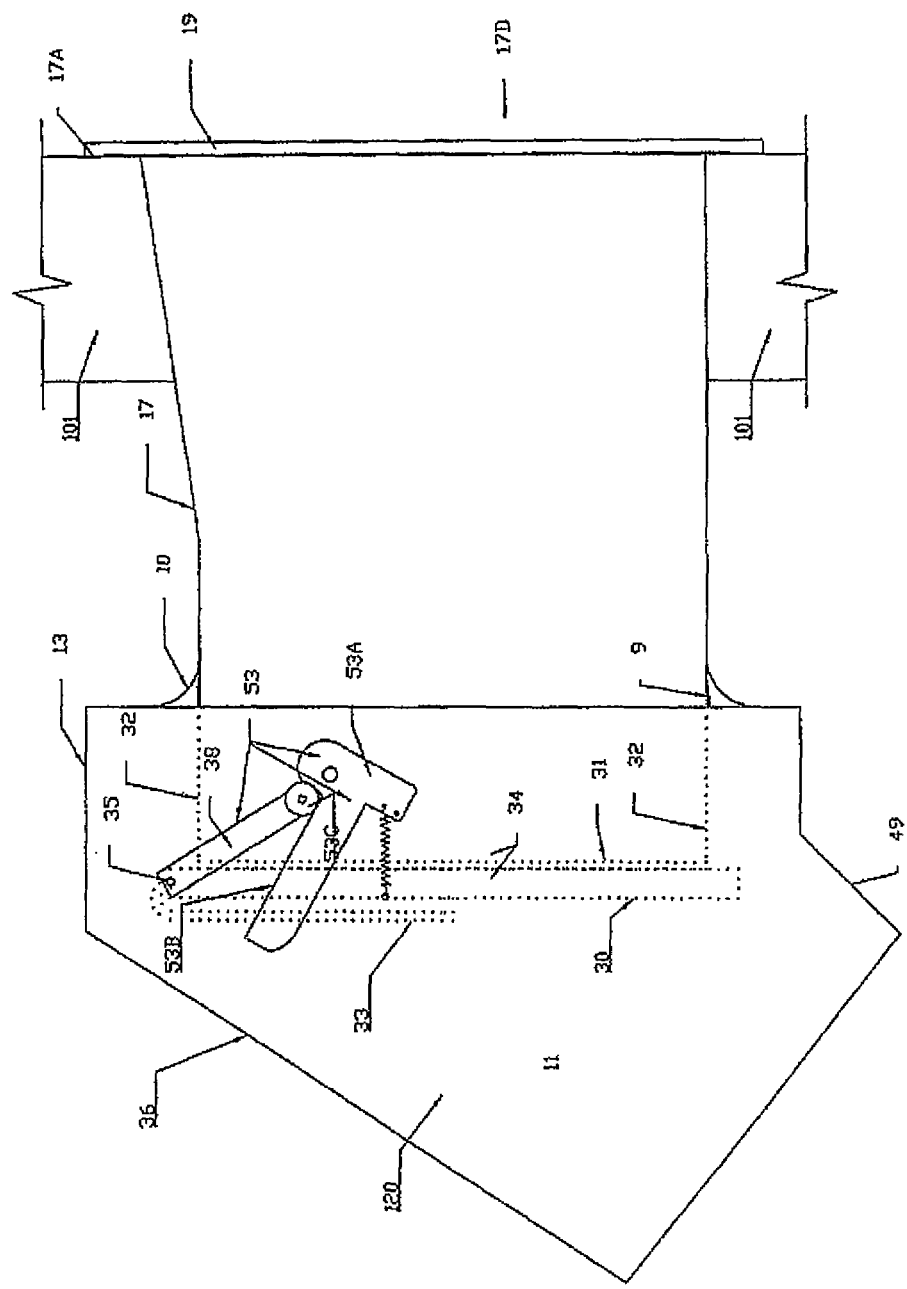
FIG. 16 is a side elevational view similar to that of FIG. 12 showing an alternative mechanism for applying the spring force to maintain the damper flap closed when required.

Turning now to FIG. 16 there is shown an alternative arrangement of the spring biasing arrangement as shown at 53 where the cam 53A has a surface 53B which is straight so that the peak previously described is omitted. However this arrangement also operates by the geometry of the system on one side of the partially open position to bias the damper flap into the closed position and on an opposed side of the partially open position to bias the damper flap into the fully open position. This is achieved in that there is a top dead center position of the cam roller 53C when the cam surface 53B is horizontal and the lever 38 is vertical. On the left of this the roller moves to the left. On the right of this the roller moves toward the right.

Figure 17:
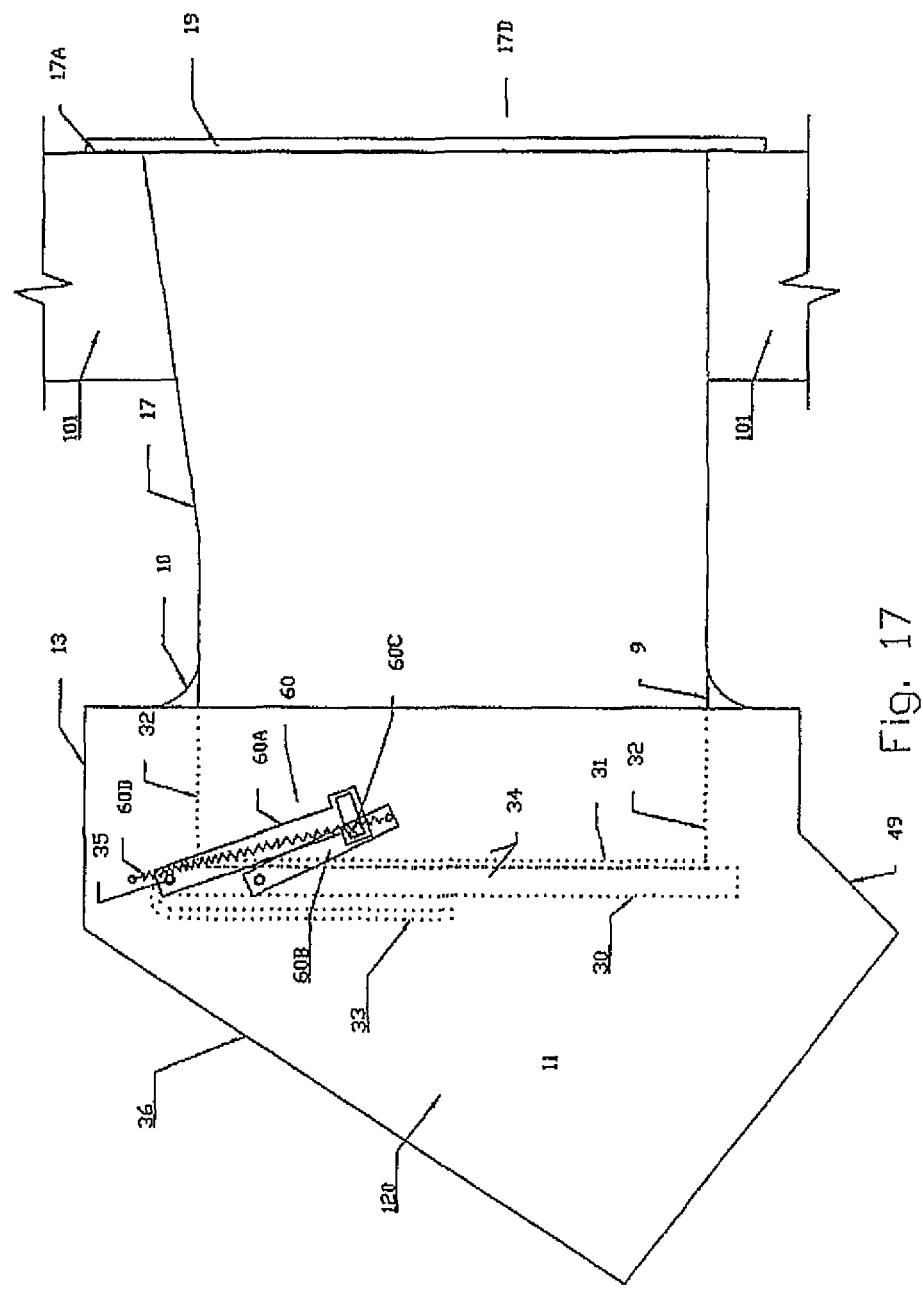
FIG. 17 is a side elevational view similar to that of FIG. 12 showing a further alternative mechanism for one-speed fans, for applying the spring force to maintain the damper flap closed or fully opened when required.

Turning now to FIG. 17, there is shown another alternative for applying spring force to the flap so that on one side of the partially open position to bias the damper flap into the tightly closed position and on an opposed side of the partially open position to bias the damper flap into the fully open position. In this arrangement 60 there are two levers 60A and 60B pivotally connected at a pin 60C at one end to each other, with the other end of the lever 60B connected to the housing and the other end of the lever 60A connected to the flap. A spring 60D applies spring force to the lever arrangement. Again there is a top dead center position of the spring and lever configuration by which the spring 60D on one side of the position applies outwards force in one direction to the open position and on the other side of the position applies inwards force in the other direction to the tightly closed position.

The main points of importance herein are as follows:

The device acts both to close the flap tightly and also to put outward force to maintain the open position in order to reduced or avoid the pressure drop, and maintain or improved the fan airflow or performance.

The device acts to put the pressure on the center of the flap in order to equally put the pressure on the edge perimeter even if any unexpected slight deformation occur on the edge.

The inward and outward force can be adjustable.

The cam may have different shapes or design in order to adapt the mechanism for the purpose required.

The device can be used on any types of fans, ducts, inlets and outlets.

The use of the proper seal is important in order to be airtight.

The abutment engaging the flap (retractable or not) (automated or not) (for air-filtered facilities or not) will allow the flap to main a certain minimum flap opening in order to control the minimum ventilation rate event with strong opposing wind.

The hood is designed to avoid airflow directly on the building and throwing the air far away from the building.

This system is either for air filtered and non air filtered facilities (agricultural, industrial etc sectors).

This system can be installed outside or inside the building.

In comparison with conventional louvers, the device provides increased fan performance by decreasing pressure drop and at the same time increasing the flap air-tightness.

The arrangement takes into account the four seasons in order to be always airtight and to not have freezing problem during the cold season.

Figure 18:
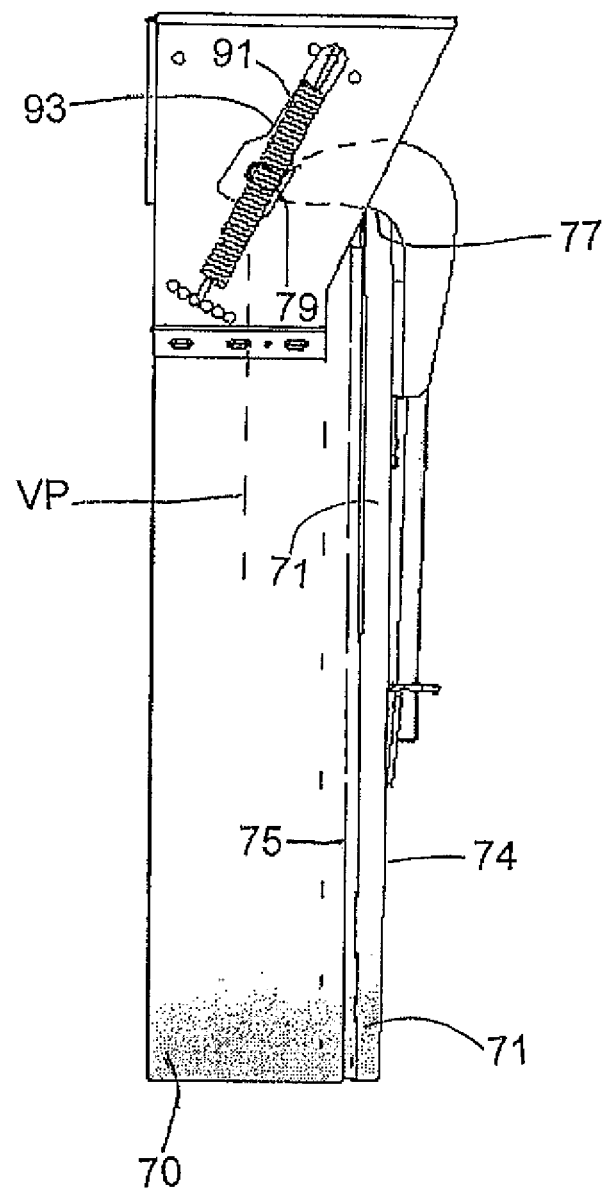
FIG. 18 is a side elevational view of the housing and flap member only showing a further alternative mechanism for mounting and control of the flap member.
Figure 19:
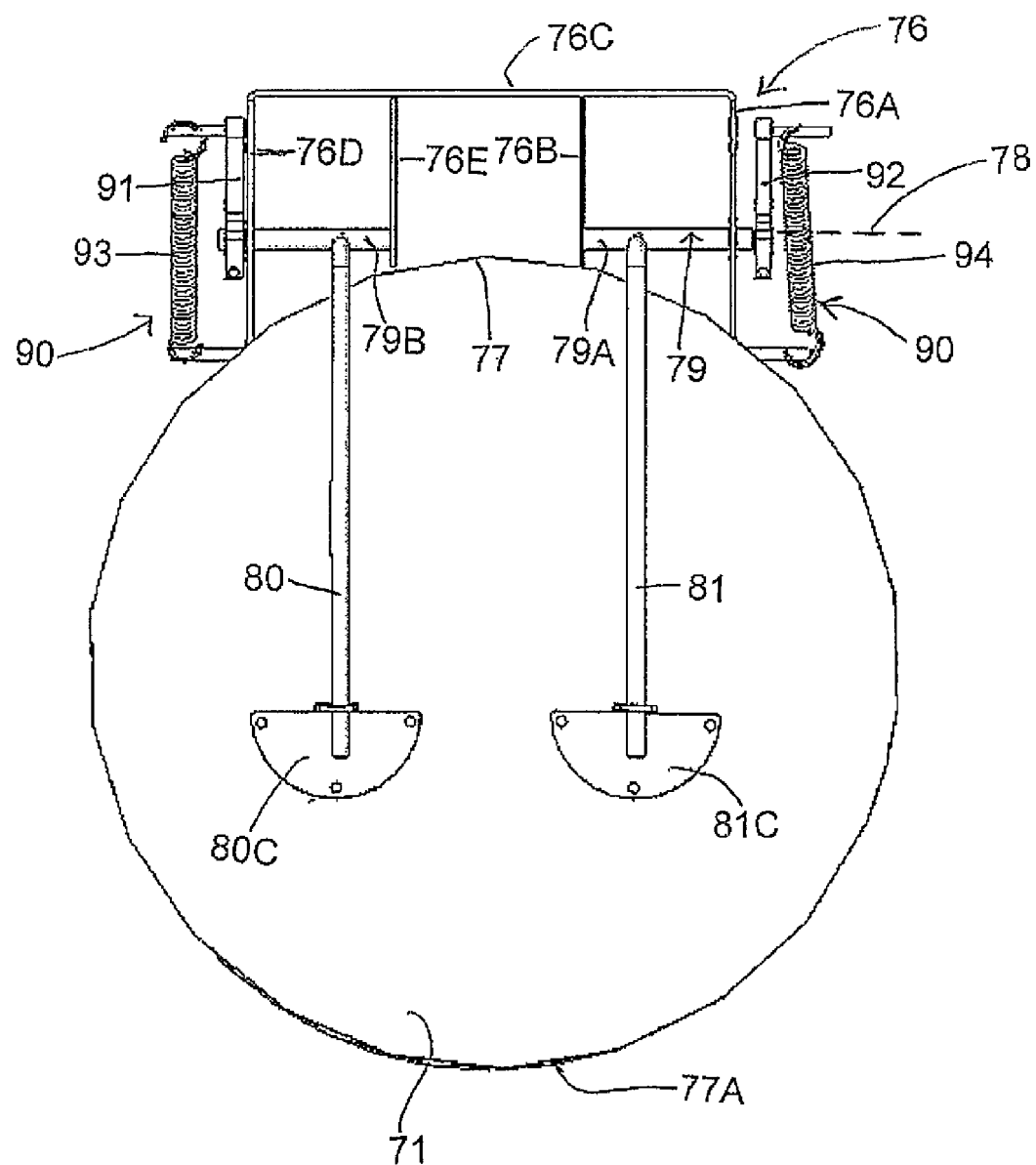
FIG. 19 is a front elevational view of the housing and flap member of FIG. 18.
Figure 20:
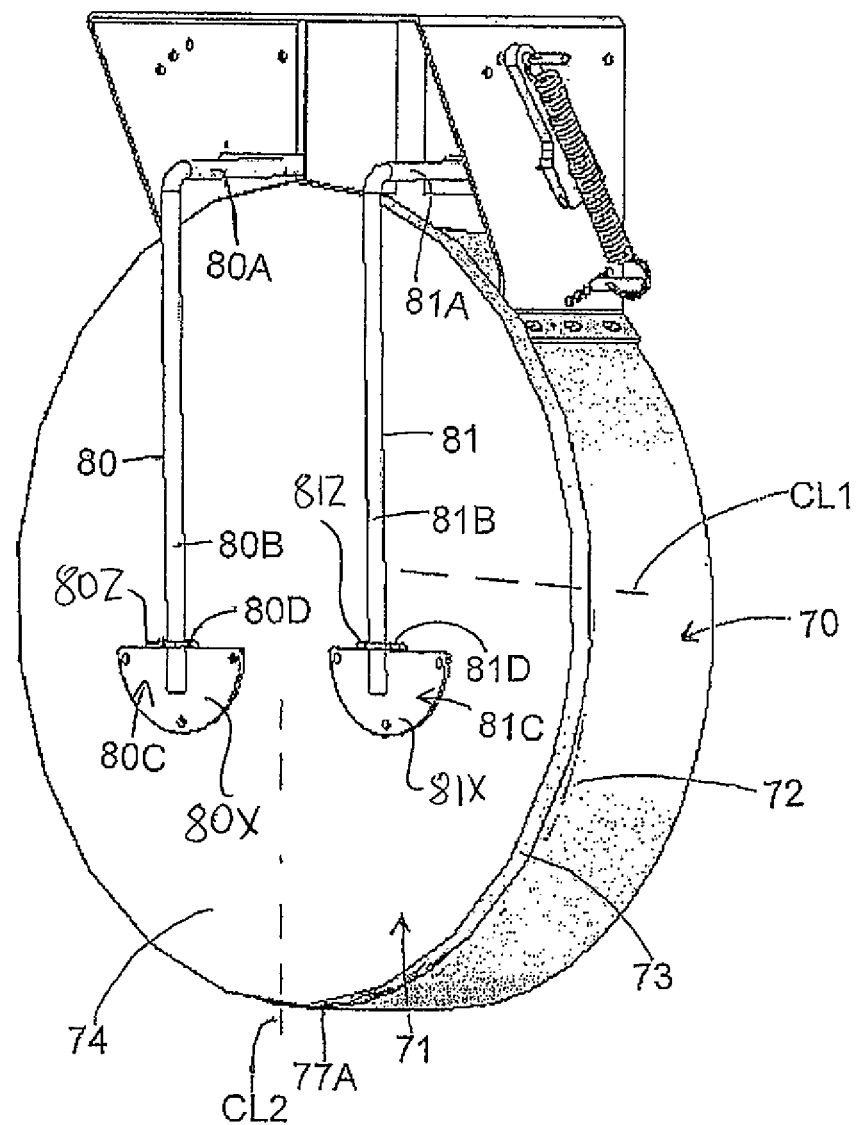
FIG. 20 is an isometric view of the housing and flap member of FIG. 18 showing an alternative arrangement of the spring biasing system.

Turning now to FIGS. 18, 19 and 20 there is shown an alternative arrangement of a cylindrical housing 70 for mounting on the fan housing and a circular disk shaped flap member 71 for pivotal movement between an open position and a closed position as shown butting against the rim 72 of the housing 70.

The damper flap assembly therefore comprises a mounting plate defined by the housing having an opening through which the air passes and a flange 72 surrounding the opening. In this Figure the mounting plate is not shown, only the flange is shown that is about 4 inches deep. The depth of the flange will change depending on the fan housing on which it is mounted. For example, if the outside perimeter of the fan housing is very tilted, there is a need to have a bigger flange in order to cover this. This flange is then mounted on the mounting plate (not shown for convenience of illustration). The pivotally mounted circular damper flap 71 is arranged to extend in the closed position across the opening when the fan is not running, with the outer peripheral edge portion 73 of the damper flap 71 engaging the flange 72 around the opening. The damper flap 71 is formed as a flat circular disk and has a front surface 74 facing forwardly away from the fan and a rear surface 75 facing toward the fan. The damper flap 71 is formed as a flat circular disk but could be designed with other shapes and arrangements as required.

The damper flap is suspended by a hinge member 76 adjacent an upper edge 77 of the damper flap 71 and pivotal about a hinge axis 78 of the hinge member. The hinge member 76 includes a transverse support 79 at the hinge axis and two support arms extending 80 and 81 from the transverse support 79 adjacent the upper edge 77. The arms are arranged symmetrically at spaced positions on respective sides of a vertical center line CL2. The arms include a first horizontal portion 80A and 81A in a direction forwardly of the damper flap to a position in front of the damper flap. The arms further include vertically depending portions 80A and 80B each of which is connected by a connection member 80C and 81C to the front face 74 of the damper flap 71 at a position below the top edge 77 of the damper flap 71.

The connection members 80C and 81C are arranged at a position adjacent or below a transverse center line CL1 of the damper flap and are connected to the damper flap 71 only at said connection members allowing top 77 and bottom edges 77A of the damper flap to flex relative to the connection members and therefore relative to the arms.

Thus the depending portions 80B and 81B extend along the front face 74 of the flap member 71 and spaced therefrom so as to move independently of the front face when flexing action of the flap member occurs.

The connection member 80C and 81C are formed by brackets 80X and 81X fastened to the front face 74 of the flap member 71 and the depending portions 80B and 81B each comprises a rod and the rod is engaged through a hole 80D, 81D in a horizontal flange 80Z, 81Z of the bracket.

The transverse support 79, as shown in FIGS. 18 and 19, is located at a position in a vertical plane VP (FIG. 18) rearward of the rear face 75 of the flap member 71 and is located at a height above the top edge 77 of the flap member.

The two arms 80 and 81 are mounted on two separate components 79A and 79B of the transverse support 79 such that the arms can pivot independently. That is the component 79A is supported between an outer support wall 76A and an intermediate support wall 76B and the component 79B is supported between an outer support wall 76D and an intermediate support wall 76E. All of the support walls depend from a top plate 76C and form a rigid frame structure from which the transverse member 79 pivots. As the frame 76 holds the transverse member 79 at a fixed position on the line 78 but the space between the walls 76B and 76E allows the components 79A and 79B to pivot or rotate relative to one another to allow flexing of the flap member.

The flap member can be used with no spring bias so that the flap member closes under gravity. However in some arrangements, there is provided a spring biasing arrangement 90 applying biasing forces from two springs 93 and 94 though levers 91 and 92 to the arms 80 and 81 in directions both toward the open position and toward the closed position. The springs are arranged in similar manner to that previously described so as to provide the lever 91, 92 with an over center action. The springs 93 and 94 which are independently adjustable to provide different forces to the damper flap such that independent adjustment provides different changes in the biasing forces. The spring 93 is arranged on one side of the hinge member and the spring 94 is arranged on the other side of the hinge member.

Figure 21:
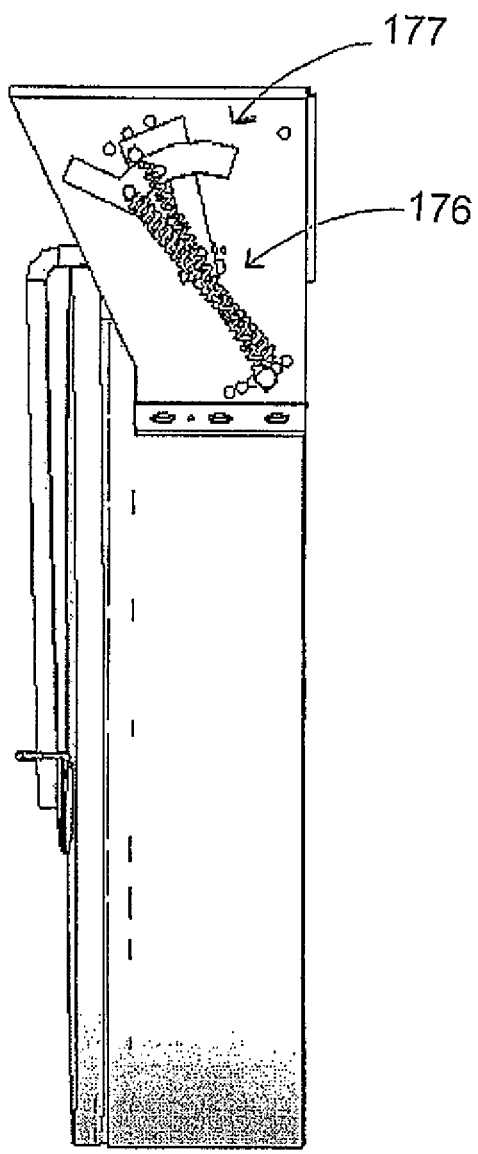
FIG. 21 is a side elevational view of the housing and flap member only showing a further alternative mechanism for mounting and control of the flap member.

In FIG. 21 is shown the same flap member and housing but using a modified spring arrangement 176 which includes two springs in a cam and cam follower 177 in the arrangement previously described.

Figure 22:
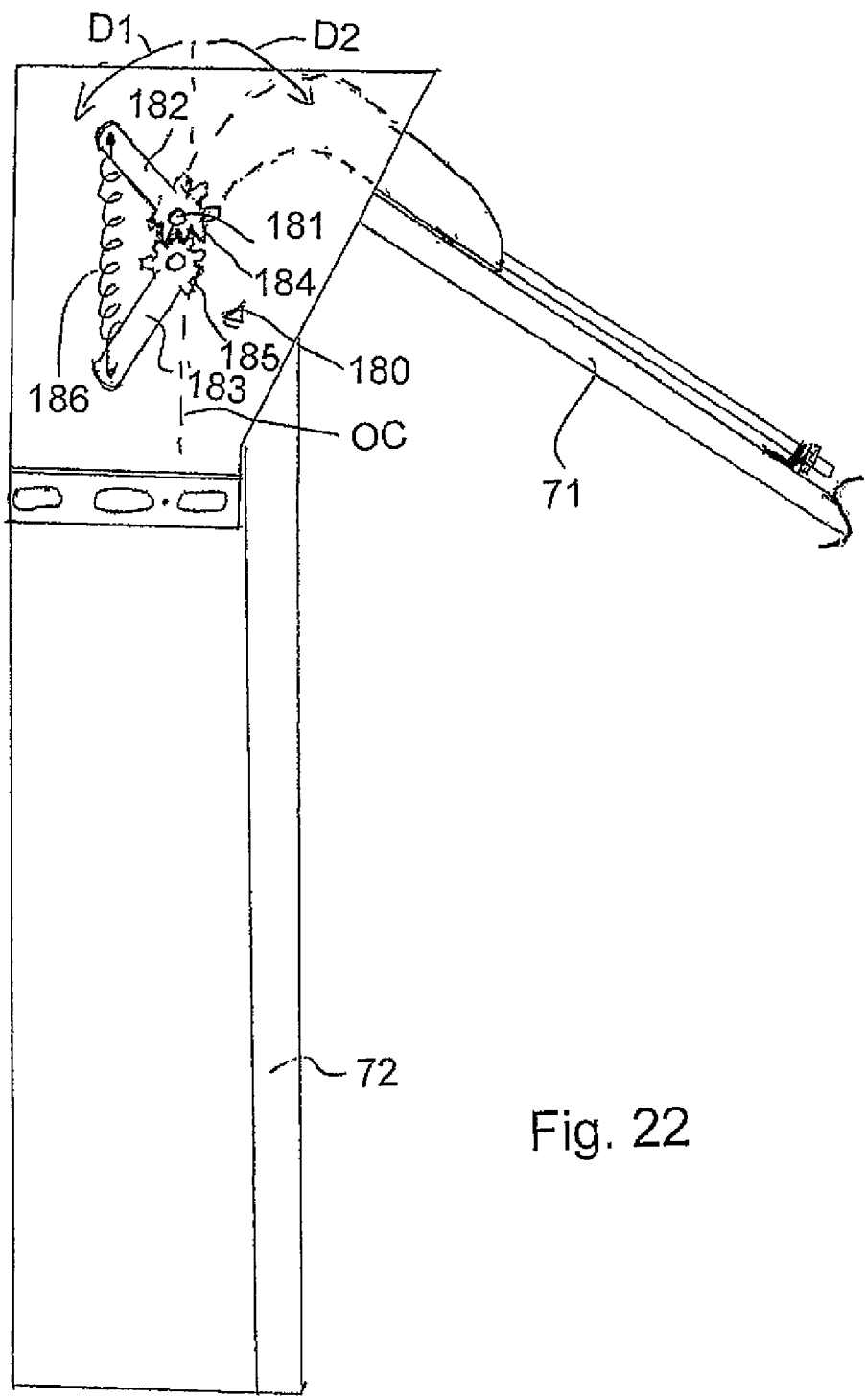
FIG. 22 is a side elevational view of the housing and flap member only showing a further alternative mechanism for control of the flap member.

In FIG. 22 is shown the same flap member and housing but using a modified spring arrangement 180 which includes a single spring and two levers. Thus the flap 71 is pivotal on the previously described arms on a transverse shaft 181. Control of the rotation of the shaft 181 is obtained by a gear 184 which meshes with a second gear 185. Rotation of the gears about their respective axes is controlled by a pair of levers 182 and 183 and a spring 186 connecting the levers. Thus, in the open position shown, the levers are biased by the spring 186 to rotate the lever 182 and the flap 71 carried on the shaft 181 in a direction toward the open position. As the flap closes due to drop in air flow, this causes rotation of the levers 182 and 183 in a direction apart to stretch the spring up to the position of maximum length when the lever 182 is at the 12.00 position and the lever 183 is at the 6.00 position. After this position, the levers move over center and the spring pulls them together with the lever 182 rotating in clock-wise direction thus biasing the flap 71 into the closed position butting the flange 72.

Thus the spring biasing arrangement includes the first lever 182 connected to the shaft 181 and the spring 186 acting on the lever 182 to pivot the shaft 181. The meshing gears 184, 185 connect the first and second levers for common movement in opposite directions as the shaft pivots. The spring 186 is connected between the two levers 182 and 183 and passes an over-center position OC as the levers rotate so as to bias the first lever 182 in a first direction D1 on one side of the over-center position and in a second direction D2 on the other side of the over-center position.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A damper flap assembly for mounting on a fan construction having a fan housing and a fan mounted in the housing;
the damper flap assembly comprising:
a mounting member having an opening through which air passes and an engagement surface surrounding the opening;
a pivotally mounted damper flap arranged to extend in a closed position across the opening when the fan is not running, with an outer peripheral portion of the damper flap forming a seal with the engagement surface around the opening;
the damper flap having a front face facing forwardly away from the fan, and a rear face facing toward the fan and an upper edge and a lower edge;
the damper flap being movable from the closed position between a partially open position to a fully open position under forward air flow from the fan by pivoting on a hinge away from the flange;
the damper flap being suspended by a hinge member adjacent the upper edge of the damper flap and pivotal about a hinge axis of the hinge member;
the hinge member including a transverse support at the hinge axis and at least one support arm having a first portion extending from the transverse support adjacent the upper edge in a direction forwardly of the damper flap to a position in front of the front face of the damper flap and a second portion extending from the first portion along the front face;
said at least one support arm having a separation from the front face and being spaced from the front face;
said second portion of said at least one support arm being connected by a connection member to the damper flap at a position below said upper edge of the damper flap;
wherein said connection member is arranged to allow said upper and lower edges of the damper flap to flex relative to said connection member;
wherein the separation of the front face at the upper edge allows the upper edge to flex forwardly and rearwardly relative to the connection member;
wherein the second portion of said at least one support arm comprises a rod which extends along the front face at a position spaced from the front face and wherein said connection member comprises at least one bracket fastened to the front face of the flap member and defining a member having a hole therethrough at right angles to the rod so that the rod is engaged through the hole of the bracket.

2. The damper flap assembly according to claim 1 wherein said at least one bracket is arranged at a position adjacent or below a transverse center line of the damper flap.

3. The damper flap assembly according to claim 1 wherein said at least one support arm comprises two separate arms spaced transversely so that each of the two separate arms is located on a respective side of a vertical centerline of the flap member with each of the two separate arms including a respective separate second portion which extends along the front face at a position spaced from the front face and wherein said at least one bracket comprises two separate brackets each fastened to the front face of the flap member and each engaged with a respective one of the two separate second portions.

4. The damper flap assembly according to claim 1 wherein there is provided a first spring biasing component arranged to act on the damper flap on one side of an intermediate position adjacent the closed position to provide a first biasing force to bias the damper flap into the closed position and a second spring biasing component arranged to act on the damper flap on an opposed side of the intermediate position adjacent the fully open position to provide a second biasing force to bias the damper flap into the fully open position.

5. The damper flap assembly according to claim 4 wherein the first and second spring biasing components are independently adjustable for independently adjusting the first and second biasing forces.

6. A damper flap assembly for mounting on a fan construction having a fan housing and a fan mounted in the housing;
the damper flap assembly comprising:
a mounting member having an opening through which air passes and an engagement surface surrounding the opening;
a pivotally mounted damper flap arranged to extend in a closed position across the opening when the fan is not running, with an outer peripheral portion of the damper flap forming a seal with the engagement surface around the opening;
the damper flap having a front face facing forwardly away from the fan, a rear face facing toward the fan and an upper edge and a lower edge;
the damper flap being movable from the closed position between a partially open position to a fully open position under forward air flow from the fan by pivoting on a hinge away from the flange;
the damper flap being suspended by a hinge member adjacent the upper edge of the damper flap and pivotal about a hinge axis of the hinge member;
the hinge member including a transverse support at the hinge axis and two separate support arms each having a first portion extending from the transverse support adjacent the upper edge in a direction forwardly of the damper flap to a position in front of the front face of the damper flap and a second portion extending from the first portion along the front face;

each of said support arms having a separation from the front face and being spaced from the front face;

said second portion of each of said support arms being connected by a connection member to the damper flap at a position below said upper edge of the damper flap;

wherein said connection member is arranged to allow said upper and lower edges of the damper flap to flex relative to said connection member;

wherein the separation of the front face at the upper edge allows the upper edge to flex forwardly and rearwardly relative to the connection member;

wherein said two separate support arms are spaced transversely so that each of the two separate support arms is located on a respective side of a vertical centerline of the flap member with each of the two separate support arms including said separate second portion thereof which extends along the front face at a position spaced from the front face and wherein said connection member comprises two separate brackets each fastened to the front face of the flap member and each engaging a respective one of the two separate second portions.

7. The damper flap assembly according to claim 6 wherein said connection member comprises at least one bracket arranged at a position adjacent or below a transverse center line of the damper flap.

8. The damper flap assembly according to claim 6 wherein there is provided a first spring biasing component arranged to act on the damper flap on one side of an intermediate position adjacent the closed position to provide a first biasing force to bias the damper flap into the closed position and a second spring biasing component arranged to act on the damper flap on an opposed side of the intermediate position adjacent the fully open position to provide a second biasing force to bias the damper flap into the fully open position.

9. The damper flap assembly according to claim 8 wherein the first and second spring biasing components are independently adjustable for independently adjusting the first and second biasing forces.

\* \* \* \* \*